United States Patent
Lloyd et al.

(10) Patent No.: US 7,593,954 B1
(45) Date of Patent: Sep. 22, 2009

(54) SYSTEM AND METHOD FOR CROSS-REFERENCING, SEARCHING AND DISPLAYING ENTRIES IN A DOCUMENT PUBLISHING SYSTEM

(75) Inventors: Gregory R. Lloyd, Providence, RI (US); Christopher J. Nuzum, Providence, RI (US); Roger Fujii, Burke, VA (US); Andrew J. Miller, Washington, DC (US); Carrie Simmons, New York, NY (US)

(73) Assignee: Traction Software, Inc., Providence, RI (US)

( * ) Notice: Subject to any disclaimer, the term of this patent is extended or adjusted under 35 U.S.C. 154(b) by 160 days.

(21) Appl. No.: 10/003,773

(22) Filed: Nov. 15, 2001

Related U.S. Application Data

(60) Provisional application No. 60/249,069, filed on Nov. 15, 2000, provisional application No. 60/248,909, filed on Nov. 15, 2000, provisional application No. 60/249,070, filed on Nov. 15, 2000.

(51) Int. Cl.
*G06F 17/30* (2006.01)

(52) U.S. Cl. .................. 707/102; 707/5; 707/101; 715/234

(58) Field of Classification Search .............. 707/1–10, 707/100–200; 345/783, 845; 380/200; 705/1, 705/9; 709/218, 223; 715/201, 205, 209, 715/230, 234
See application file for complete search history.

(56) References Cited

U.S. PATENT DOCUMENTS

| | | | | |
|---|---|---|---|---|
| 5,806,079 A | * | 9/1998 | Rivette et al. | 715/512 |
| 5,860,067 A | * | 1/1999 | Onda et al. | 705/9 |
| 5,864,868 A | * | 1/1999 | Contois | 707/104.1 |
| 5,930,788 A | * | 7/1999 | Wical | 707/5 |
| 6,067,565 A | * | 5/2000 | Horvitz | 709/218 |
| 6,078,924 A | * | 6/2000 | Ainsbury et al. | 707/101 |
| 6,131,098 A | * | 10/2000 | Zellweger | 707/102 |

(Continued)

OTHER PUBLICATIONS

International Standard. Information Technology-Hypermedia/Time-based Structuring Language (HyTime). ISO/IEC JTC1/SC18/WG8N1920 second ed. Aug. 1, 1997.*

*Primary Examiner*—Shahid A Alam
(74) *Attorney, Agent, or Firm*—Lahive & Cockfield, LLP; Kevin J. Canning; John S. Curran

(57) ABSTRACT

The illustrative embodiment of the present invention provides a method for cross-referencing, searching and displaying entries in a document publishing system, such as a web-publishing system or a desktop publishing system. The document publishing system uses input data such as email messages, attachments to emails, web clippings, and directly input text from a user to create new documents. The illustrative embodiment assigns an entry identification number to each new entry, an item identification number to each segment of the entry, and user-assigned labels to user-selected subparts of each entry. The entry identification numbers, item identification numbers and labels are automatically cross-linked by a series of algorithms. The identification numbers and labels are cross-linked with stored references which are used to dynamically generate HTML links. Changes in the content of a entry are saved as updates, where the latest version of a entry is cross-linked to previous versions. The cross-linking of the entries enables a user to search back through time for the content of previous versions or alternatively, to see the latest version of a previous entry.

24 Claims, 20 Drawing Sheets

U.S. PATENT DOCUMENTS

| | | | |
|---|---|---|---|
| 6,295,542 B1 * | 9/2001 | Corbin | 715/205 |
| 6,311,189 B1 * | 10/2001 | deVries et al. | 707/102 |
| 6,411,724 B1 * | 6/2002 | Vaithilingam et al. | 382/100 |
| 6,421,675 B1 * | 7/2002 | Ryan et al. | 707/100 |
| 6,460,052 B1 * | 10/2002 | Thomas et al. | 707/1 |
| 6,484,156 B1 * | 11/2002 | Gupta et al. | 707/1 |
| 6,505,219 B1 * | 1/2003 | MacLean et al. | 715/530 |
| 6,546,405 B2 * | 4/2003 | Gupta et al. | 715/512 |
| 6,571,239 B1 * | 5/2003 | Cole et al. | 707/5 |
| 6,631,373 B1 * | 10/2003 | Otani et al. | 707/5 |
| 6,675,177 B1 * | 1/2004 | Webb | 707/200 |
| 6,725,227 B1 * | 4/2004 | Li | 707/102 |
| 6,751,623 B1 * | 6/2004 | Basso et al. | 707/101 |
| 6,763,496 B1 * | 7/2004 | Hennings et al. | 715/501.1 |
| 6,781,609 B1 * | 8/2004 | Barker et al. | 715/760 |
| 6,820,093 B2 * | 11/2004 | de la Huerga | 707/104.1 |
| 6,877,134 B1 * | 4/2005 | Fuller et al. | 715/202 |
| 6,920,608 B1 * | 7/2005 | Davis | 715/209 |
| 6,959,299 B2 * | 10/2005 | Hiraiwa | 707/101 |
| 6,988,134 B2 * | 1/2006 | Thorpe et al. | 709/223 |
| 7,039,857 B2 * | 5/2006 | Beck et al. | 715/500.1 |
| 7,051,275 B2 * | 5/2006 | Gupta et al. | 715/201 |
| 7,272,786 B1 * | 9/2007 | McCullough | 715/234 |
| 2002/0152087 A1 * | 10/2002 | Gonzalez | 705/1 |

* cited by examiner

*Lahive*
notice d w m q y a | today    < 8 Nov 2000 - 8 Nov 2000 >

Current Perspective

Lahive 37
8 Nov 2000
5:43 pm                                      update
                                             headline
by jsc                                       notice

House
The house is green.  01                      color

Lahive 33
8 Nov 2000                                   update
1:48 pm                                      headline
                                             done
by jsc                                       bug fixed email
The bug in the parser for the email is fixed.  We just had to tweak the    notice
algorithm a little bit.  01

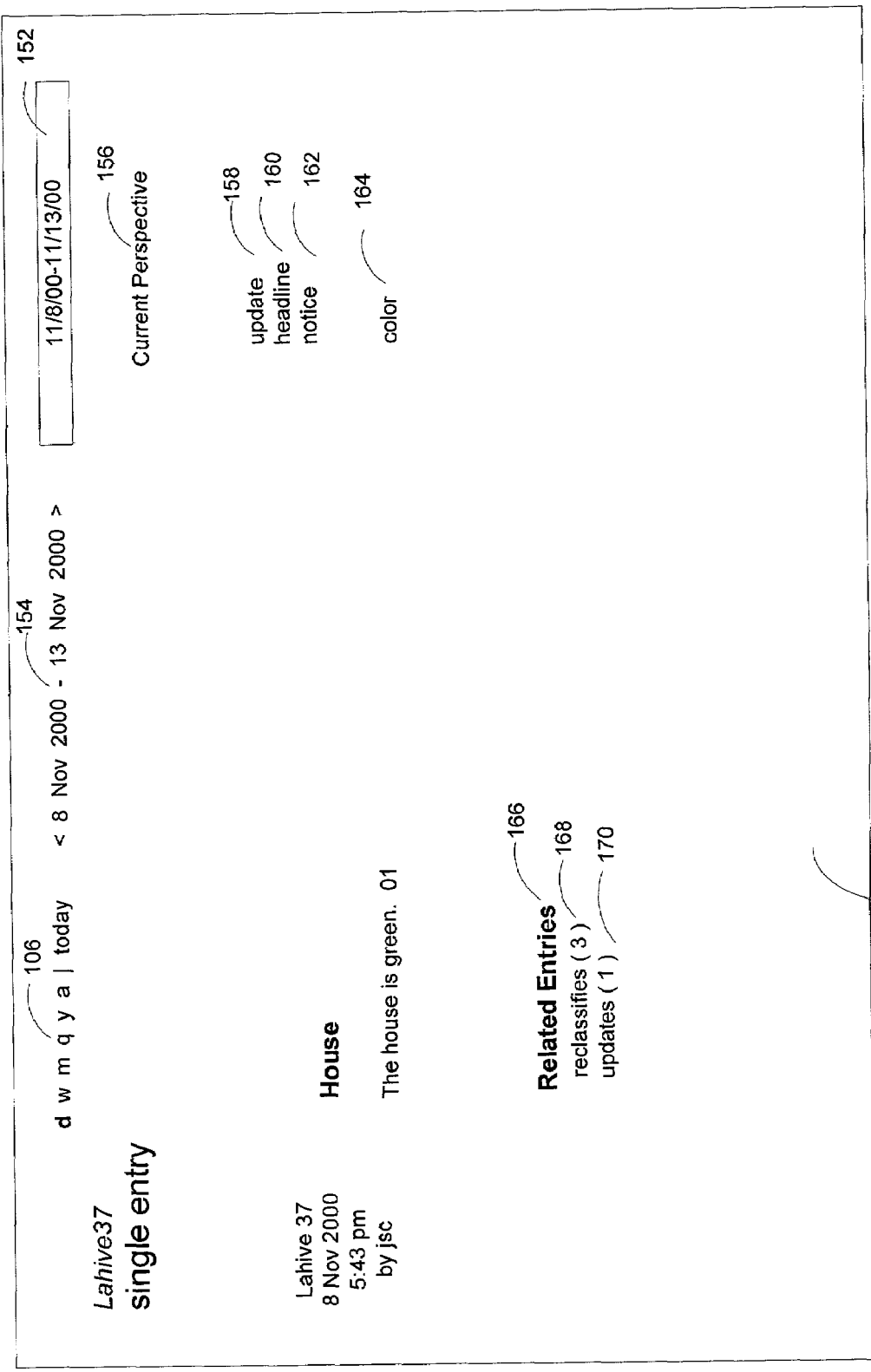

SYSTEM AND METHOD FOR CROSS-REFERENCING, SEARCHING AND DISPLAYING ENTRIES IN A DOCUMENT PUBLISHING SYSTEM

TECHNICAL FIELD

The illustrative embodiment of the present invention relates generally to document publishing systems and more particularly to the cross-referencing, searching and displaying of entries in a web publishing or desktop publishing system.

BACKGROUND OF THE INVENTION

Web publishing systems convert data into web pages capable of being viewed by a user executing an XML interpreter or HTML interpreter such as those found in web browsing software. Web publishing systems are usually implemented in the context of a network. Traditionally these web pages have been manually produced, although software enabling the automatic generation of web pages has been growing in popularity in recent years. These conventional methods of generating a web page involve the use of stored data, the utilization of user input data, or a combination of both stored and user input data to produce a web page. These conventional automatically generated web pages present only a limited number of static data relationships between items referenced on the web page. The relationships are fixed links which do not change as the relationships in the underlying data change. Desktop publishing systems also generate documents converted from raw data but are implemented in the context of a stand-alone electronic device, usually a computer.

Communications software, such as email systems used in office settings, process and store large amounts of data. Conventional methods of retrieving data from the collection of stored data involve searching for the data by means of a title, subject, or message content reference. In the case of email messages, this can require a user to sort through a large number of emails containing identical subject lines without any means to distinguish one email from the next. Publishing systems working with these communications software packages have no effective means of presenting retrieved data to a user in a format that indicates the relationships between the presented piece of data and other pieces of stored data. Conventional methods of document publishing also do not allow the presentment to a user of the changes in the relationship between a piece of data and other data over time.

SUMMARY OF THE INVENTION

The illustrative embodiment of the present invention provides a method for cross-referencing, searching and displaying entries in a document publishing system. The publishing system uses input data such as email messages, attachments to emails, web clippings, and user input text, to create new documents, such as web pages viewable via a web browser. Unique identification numbers are automatically assigned to entries in the publishing system and naturally occurring segments of entries, such as headings and paragraphs separated by whitespace. User assigned labels may be attached to user selected segments of each entry. The identification numbers and labels are cross-linked by a series of algorithms. Changes in content of a entry are saved as updates with the latest version cross-linked to previous versions. The labels applied to the previous version of the entry are automatically applied to the corresponding segments of the updated entry, even if the labeled segments are updated or rearranged by the update action. The cross-linking of entries enables users to search by time (content), by topic (label), or both. Different versions of content in a entry may be displayed to a user such that the evolution of a entry over time is revealed. Searching may also be conducted using labels or topics as keywords such that either user-attached labels or automatically generated labels from the cross-linking algorithms are used to generate documents for users which display references to entries and/or items containing the particular label or topic. Documents generated by the illustrative embodiment include links to other entries and/or items which are associated with the content being displayed to the user. The user assigned labels also enable a search mechanism to quickly assemble user-defined relevant portions of each entry while omitting extraneous matters contained in the entries.

The cross-linking of entries enables users to search by the time when entries were posted, by the time when reclassification actions were taken, by topic labels associated with entries, by text content of entries, or by the combination of any of these methods. The time slice, perspective (which controls which labels are displayed), level of detail (brief/full), and active search filter are collectively referred to as the "viewspec". The illustrated embodiment saves the last viewspec selected by a user for a given type of view, and selectively applies it to the subsequent web pages generated by the server for that user and that type of view. A bulletin board feature contains entries that remain displayed on the newspage despite the user switching between Newspage views with differing viewspecs. Different versions of content in an entry may be displayed to a user depending on the viewspec such that the evolution of an entry over time is revealed. A timeline may be generated at user request tracing the evolution of an entry. Searching of the entries in the publishing system may also be conducted by a user entering search terms in a dialog box and the search capablties include the ability to search a thematically grouped set of entries.

In one embodiment, unique identification values are assigned to each entry in a group of entries. The entries are stored indexed by their assigned ID. Each entry has associated with it a metastructure containing metadata. Subsequently, a new entry is created by altering the content of a selected one of the indexed entries. The new entry is cross-indexed with the selected entry. The metastructure is updated to reflect the time of the alteration. A subsequent user request for the selected entry results in the new entry being displayed as a document to the user.

In another embodiment taking place in a network, a selected entry is stored and then updated to create a new entry. The new entry is cross-indexed with the selected entry and displayed in place of the selected entry upon a request for the selected entry. The display of the new entry includes links back to the selected entry.

BRIEF DESCRIPTION OF THE DRAWINGS

FIG. 3B depicts a web page generated by a user clicking a label on the web page of FIG. 3A;

FIG. 5 depicts the use of perspective by the illustrative embodiment of the present invention;

DETAILED DESCRIPTION OF THE INVENTION

The illustrative embodiment of the present invention provides a method for cross-referencing, searching and displaying entries in a document publishing system. The publishing system uses input data such as email messages, attachments to emails, web clippings, and directly input text from a user to create new documents to display. The illustrative embodiment assigns an entry identification number to each new entry, an item identification number to each segment of the entry, and user assigned labels to user selected subparts of each entry. The entry identification numbers, item identification numbers and labels are automatically cross-linked by a series of algorithms. The identification numbers and labels are cross-linked with stored references which are used to dynamically generate HTML links. Changes in the content of a entry are saved as updates, where the latest version of a entry is cross-linked to previous versions. The cross-linking of the entries enables a user to search back through time for the content of previous versions or alternatively, to see the latest version of a previous entry.

Figure 1A:
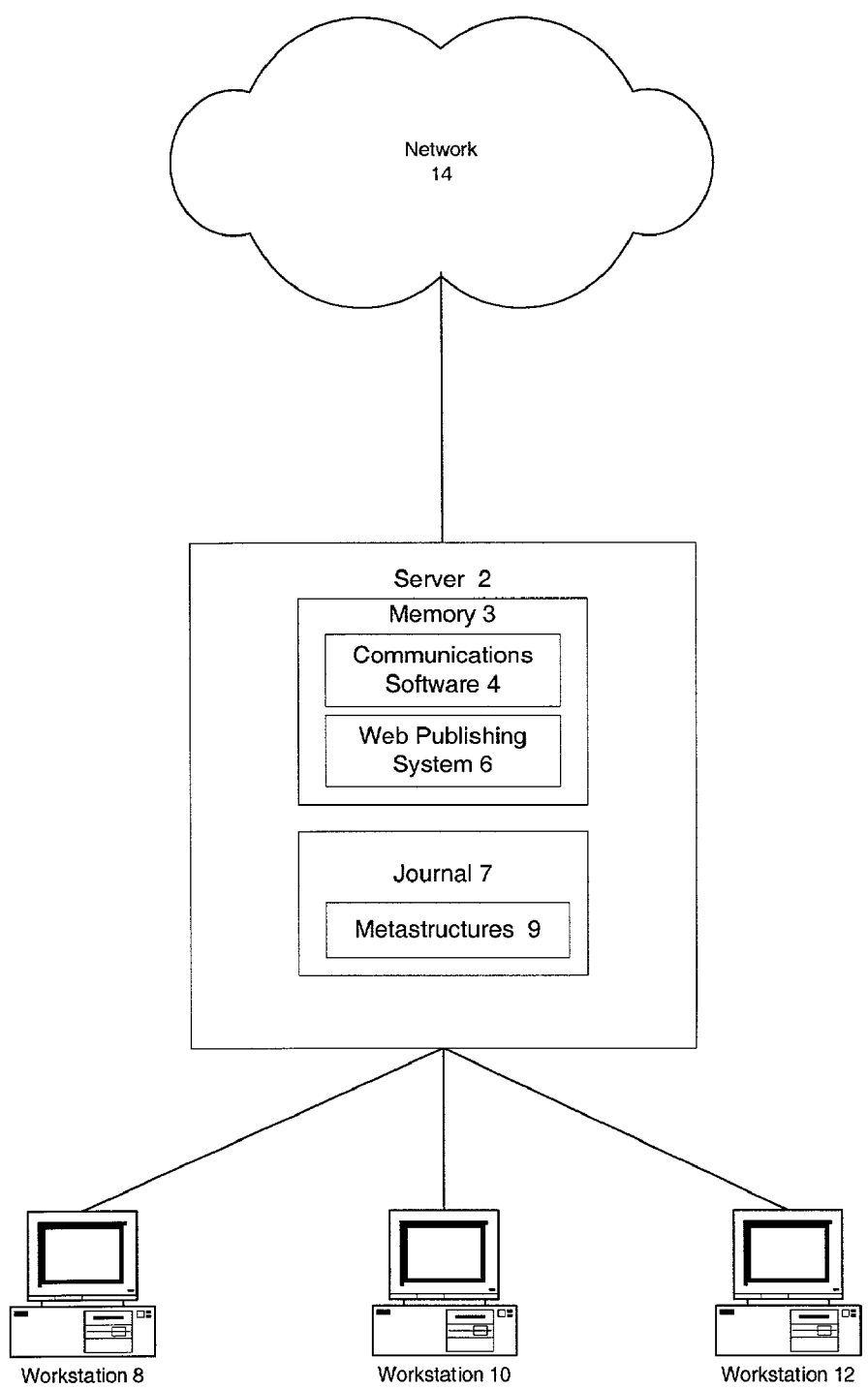
FIG. 1A depicts a block diagram of an enviroment suitable for practicing the illustrative embodiment of the present invention.

The illustrative embodiment of the present invention runs on a server and accepts input data, such as email messages, attachments to emails, web clippings sent to the server, and text directly input by a user in order to create new documents, such as web pages, for display. FIG. 1A depicts one possible topology used by the illustrative embodiment. A server 2 includes volatile memory 3, such as RAM, holding communications software 4 and the web publishing system of the illustrative embodiment 6. The server also includes a data structure which is referred to as a "journal" 7. The journal 7 is located in non-volatile memory, such as on a hard drive. The journal 7 is used to hold the input data used by the web publishing system 6, including data passing through the communications software 4 such as emails and email attachments. The data is parsed and stored in metastructures 9 in the journal. The journal 7 and the metastructures 9 are described in more detail below. Workstations 8, 10 and 12 are also connected to the server 2. The server 12 is interfaced with a network 14. The network 14 may be any one of number of different types of networks such as the Internet, a local area network (LAN), a wide area network (WAN), an intranet, an extranet, or a wireless network. Those skilled in the art will recognize that while the illustrative embodiment of the present invention is described throughout with reference to a web publishing system, the illustrative embodiment of the present invention is equally applicable to a desktop publishing system or other types of document publishing systems. Accordingly, all references contained herein to a web publishing system should be understood to encompass document publishing systems in general.

The input data for the web publishing system (i.e.: email messages, attachments to emails, web clippings sent to the server, and directly input text) is parsed and stored in the journal 7 as separate entries. The data may include complete documents or only portions of documents. References to other entries, updates and reclassifications are kept in metastructures 9 stored in indices. The concepts of references, updates and reclassifications used by the illustrative embodiment is explained below. The metastructures 9 include grammar objects derived from the content recorded in the journal which express ternary relationships of the form "subject-verb-direct object", for example "Lahive43 updates Lahive37" (updating refers to the process of changing the content of an entry and is discussed below). Additional information is occasionally included with the grammar object, for example "Lahive39 reclassifies Lahive37.01 adding the label color" (reclassifying refers to the process of altering labels in an entry and is discussed below). The grammar objects include dates for all contained references which allows for the reconstruction of entry relationships for any given point in time.

Figure 1B:
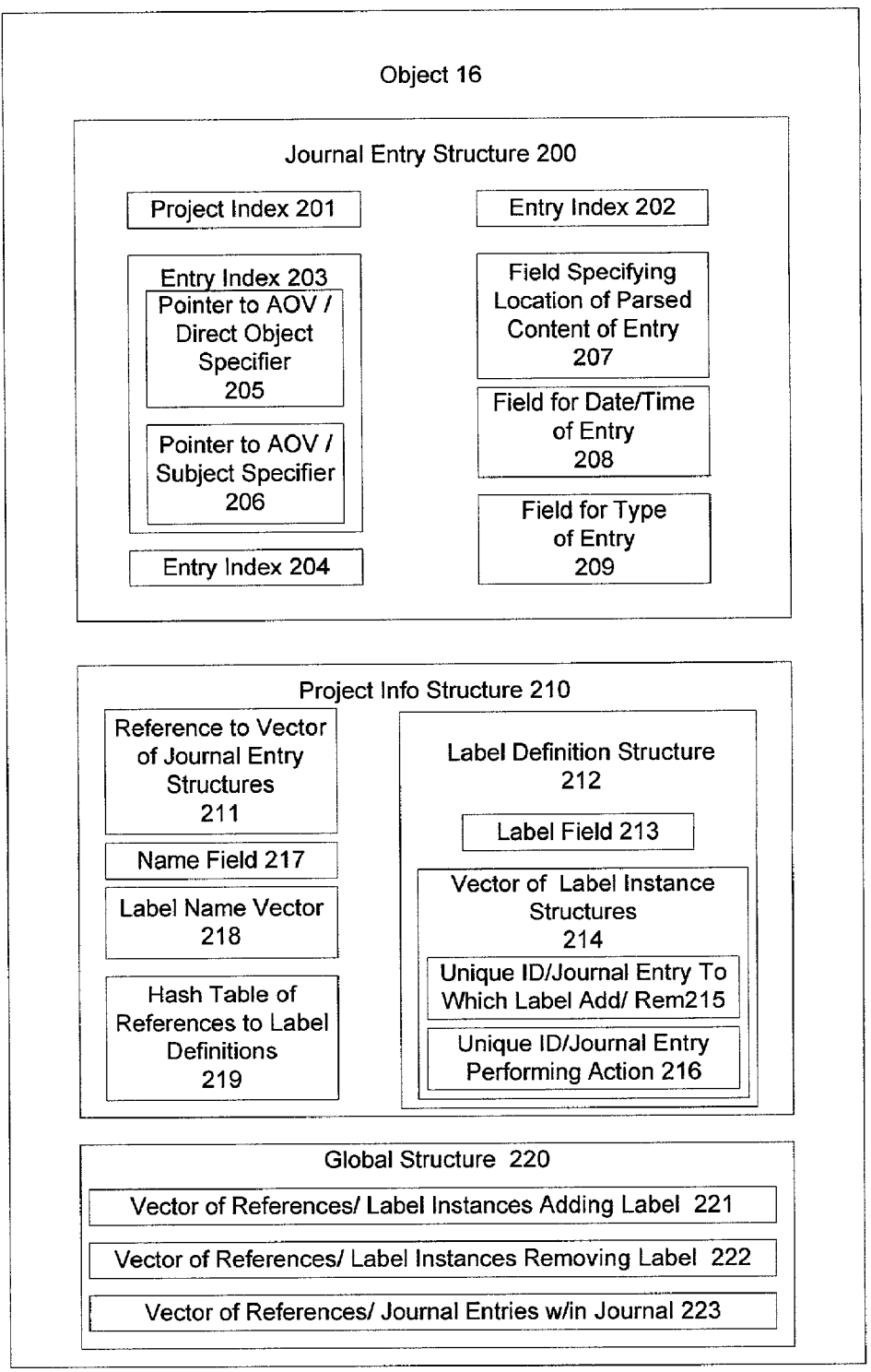
FIG. 1B depicts a block diagram of an object held by the metastructure of FIG. 1A.

FIG. 1B depicts an object 16 held in the metastructure 9 in the illustrative embodiment of the present invention. The functionality of the metastructure 9 is described in detail below. The object 16 encapsulates data structures including journal entry structures 200, project info structures 210, and global data structures 220. The journal entry structure 200 includes a project index 201 locating the entry in a vector of project info structures and an entry index 202 selecting a single entry from within a given project. The journal entry structure 200 also includes an entry index 203 selecting the original entry in a chain of updates in the project, and an entry index 204 selecting the last entry in the chain of updates. The entry index 203 for the first entry in a chain of updates in the project includes a pointer 205 to an array of vectors of ternary relationships of the form subject-verb-direct object where the direct object specifies the identifier of the current entry, and a pointer 206 to an array of vectors of ternary relationships of the form subject-verb, direct object where the subject specifies the identifier of the current entry. Also included in the journal structure are a field which specifies where the parsed content of the entry is stored 207, represented as a locator id within a file containing the parsed content of all journal entries, a field 208 indicating the date and time the entry was posted and by whom, and a field 209 indicating the type of entry.

The project info structure 210 includes a reference 211 to a vector of "journal entry" structures recording metadata associated with each entry created within that project, and a reference to a hash table of references to "label definition" structures 212. The label definition structure 212 include a field 213 recording when the label was created, by whom it was created, and the spelling of the label name. The label definition structure 212 also includes a reference to a vector of "label instance" structures 214. The label instance structure 214 includes a unique identifier 215 of the journal entry and item number to which the label was added or removed (the "Subject" entry) and the unique identifier 216 of the journal entry which performed the action of adding or removing the label (the "Direct Object" entry). The project info structure 210 also includes a field 217 which records the spelling of the project's name, a vector 218 which records the spelling of each label name created within the project, and a hash table 219 of references to "label definitions" created within that project, indexed by label name.

The global structure 220 includes a vector 221 of references to each "label instance" which adds a label, a vector 222 of references to each "label instance" which removes a label, and a vector 223 of references to each "journal entry" within the journal.

The cross-linking of entries enables users to tailor their search according to time and topic. Specific versions of content in an entry may be displayed such that the evolution of an entry is displayed to a user. Searching may also be conducted by topic such that user-attached labels or the automatically generated labels are used to generate web pages for users which display references to entries and/or items containing the particular label or topic. The web pages generated by the illustrated embodiment include links, in one embodiment, HTML links, to other entries and/or items which are associated with the content being displayed to the user.

Figure 6A:
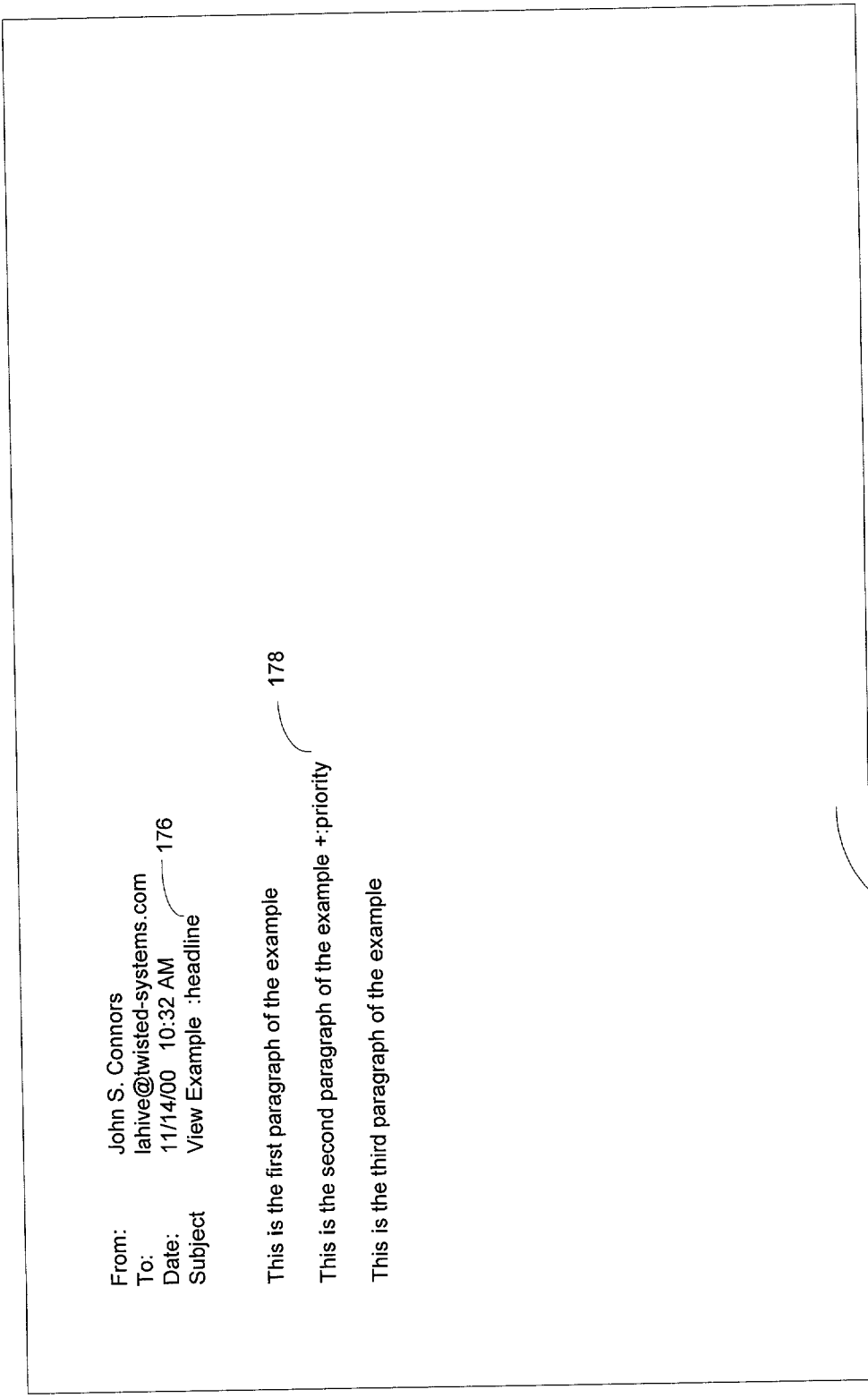
FIG. 6A depicts an email to a server running the illustrative embodiment of the present invention.
Figure 6B:
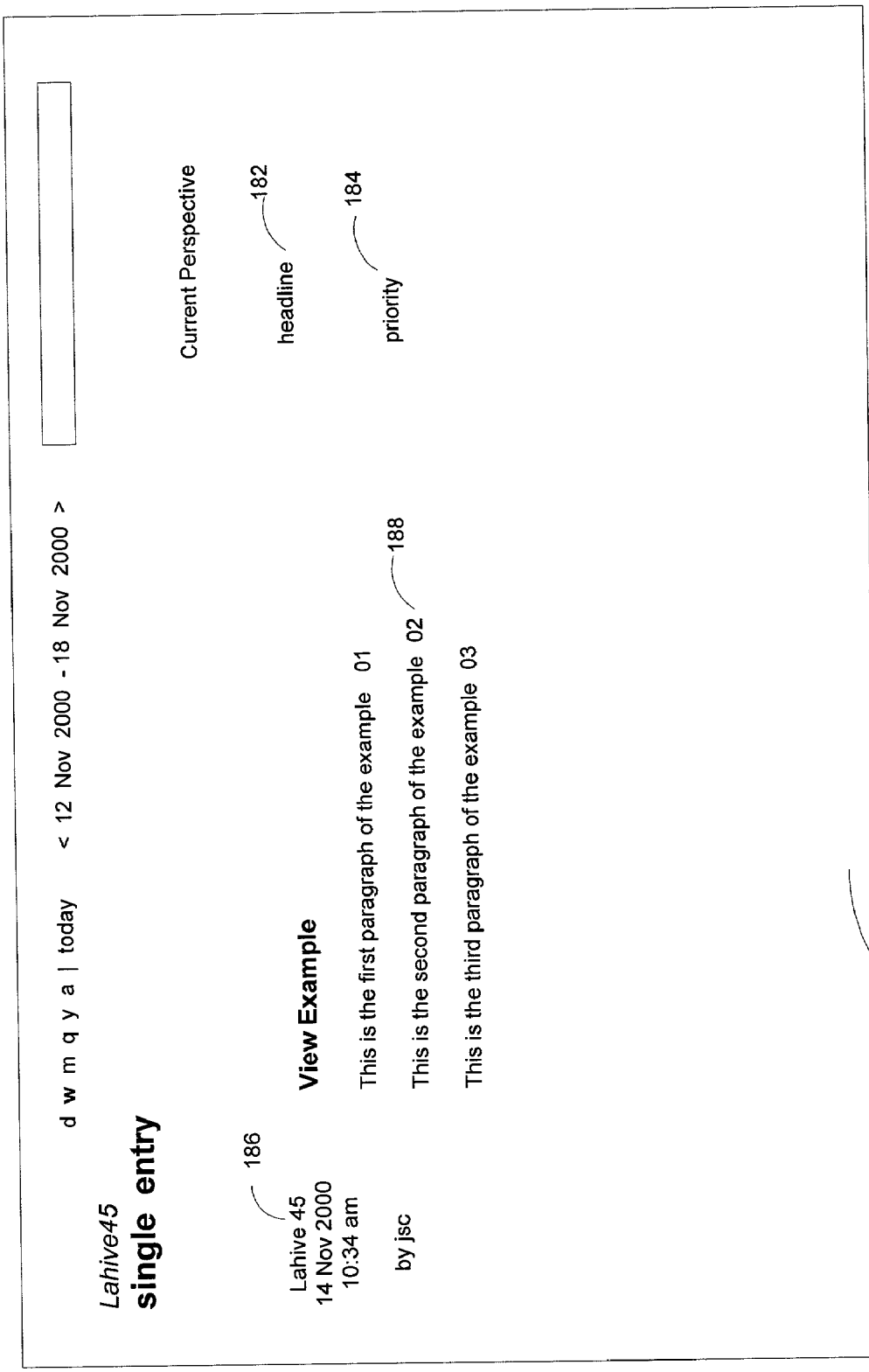
FIG. 6B depicts the email of FIG. 6A converted to a web page by the illustrative embodiment of the present invention.

Each new group of input data is assigned a unique numerical identifier known as an entry ID. A parser is used to segment each group of input data. In one embodiment, an XML parser is used to parse text at blank lines into paragraph sized blocks while HTML data is parsed into HTML block containers. Each parsed subpart of the entry is assigned a unique numerical identifier known as an item ID. FIGS. 6A and 6B which are discussed below illustrate the process. In other embodiments, a parser may segment the input data into individual characters for text data, or individual data coordinates in the case of input audio or video data. The parser may segment the data in any manner which enables an item ID to be mapped to a specified segment.

After segmenting the data, the data can be generated as a web page capable of being displayed in a number of different ways to a user. The user may assign labels to the entry as a whole, or to selected segments of each entry. The labels are displayed when the entries are generated as web pages. These labels may reflect the status of actions to be taken regarding the content contained in the entry such as "to do" or "done", or they may reflect a user assigned description or topic for the content in the entry such as "bug".

Figure 2A:
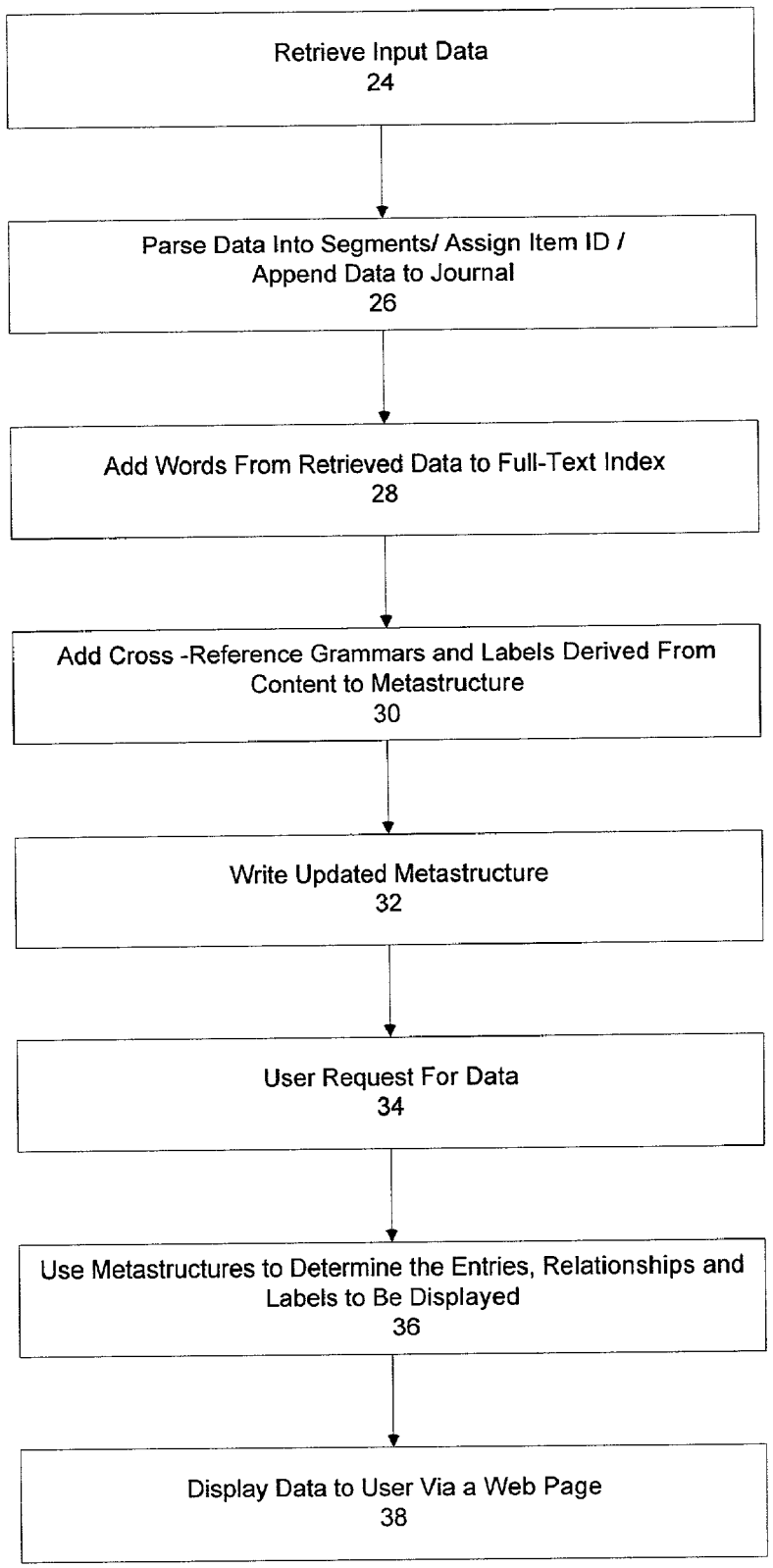
FIG. 2A is a flowchart of the sequence of steps followed by the illustrative embodiment in generating a web page for a new entry.

The illustrative embodiment of the present invention generates web pages for new entries, updated entries, and reclassified entries. FIG. 2A depicts the sequence of events occuring during generation of a web page for a new entry appended to the journal, an entry that has not been previously parsed. Input data for the new entry is retrieved (step 24), either directly from a user or from stored data. The data is parsed into segments, assigned an Item ID and the parsed data is appended to the journal 7 (step 26). The journal functions as a sequential log that contains the content of all entries; the record of all of the label additions and removals (due to reclassification), the record of updates, and the cross-references between entries. The illustrative embodiment of the present invention contains a full-text index and the words contained in the input data are added to the vocabulary list of the full-text index if they are not already present in the vocabulary list, and the location of each use of a vocabulary word is recorded in the index (step 28). Cross-reference grammars occurring in the input data and labels derived from the input data are added to the metastructure 9 (step 30). The updated metastructure 9 is then written to permanent memory 7 (step 32). Upon receiving a user request (step 34), the metastructure 9 for the new entry is consulted to determine the entries, relationships and labels to be displayed (step 36). The cumulative effect is presented to a user as a web page with the actual content of the web page being retrieved from the journal (step 38). The pointers contained in the metastructures 9 are used to generate HTML links on the web page to other items or other entries. Those skilled in the art will recognize that the data may be presented to a user in other ways than as a web page without departing from the scope of the present invention.

Figure 2B:
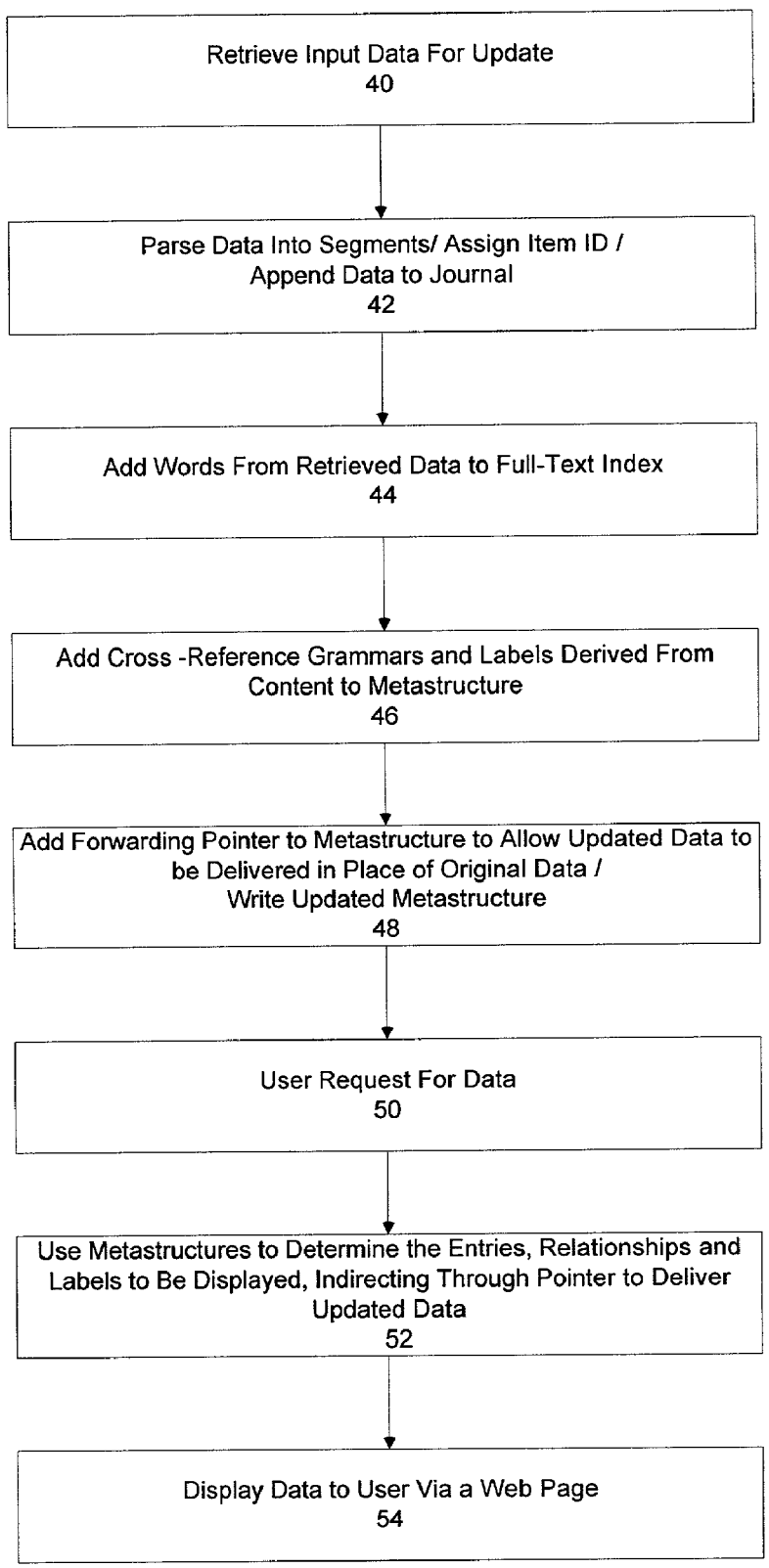
FIG. 2B is a flowchart of the sequence of steps followed by the illustrative embodiment in generating a web page for an updated entry.

Entries created by the illustrative embodiment may be updated. Updating an entry ripples back in time by automatically linking previous versions of a entry to the new updated entry. The content of the original entry is still retrievable, but must be specifically requested by a user. Absent specific requests to the contrary, accessing the original entry will present a user with the content and cross-references of the successor entry (the entry which updates it). FIG. 2B depicts the sequence of events occuring during generation of a web page for an update entry, an entry that has previously been parsed and for which the content is being changed. In the event the input data represents an updated entry, the same initial sequence is followed as occurs in the case of a new entry. The input data for the update is retrieved (step 40). The input data is then parsed into segments, the segments are each assigned an Item ID, and the parsed data is appended to the journal (step 42). Words in the input data are added to the vocabulary list of the full-text index if they are not already present in the vocabulary list, and the location of each use of a vocabulary word is recorded in the index (step 44). Cross-reference grammars and labels derived from the input data are added to the metastructure 9 (step 46). A "forwarding pointer" is also added to the metastructure 9 allowing the updating entry to be delivered in place of the updated entry and the updated metastructure 9 is then written (step 48). Upon receiving a user request (step 50), the metastructures 9 are consulted to determine the entries, relationships and labels to be displayed, indirecting through a "forwarding pointer" to deliver the updated data (step 52). The cumulative effect is presented to a user as a web page with the actual content of the web page being retrieved from the journal (step 54). The pointers contained in the metastructures 9 are used to generate HTML links on the web page/document to other items or other entries.

The user assigned labels enable a search mechanism to quickly assemble, for web publishing purposes, user-defined relevant portions of each entry while leaving extraneous matters contained in the entries alone. The set of labels attached to a portion of an entry may be changed over time by users. The labels represent classifications of the entry, and a change to the set of labels is therefore referred to as a reclassification. Reclassifications ripple back through time to affect the classifications contained in previous versions of the entry. When an entry is updated, the labels associated with a given segment identified by item id in the original entry are automatically applied to the segment with the same item id in the updated entry (if the item id is not deleted as part of the update action).

Figure 2C:
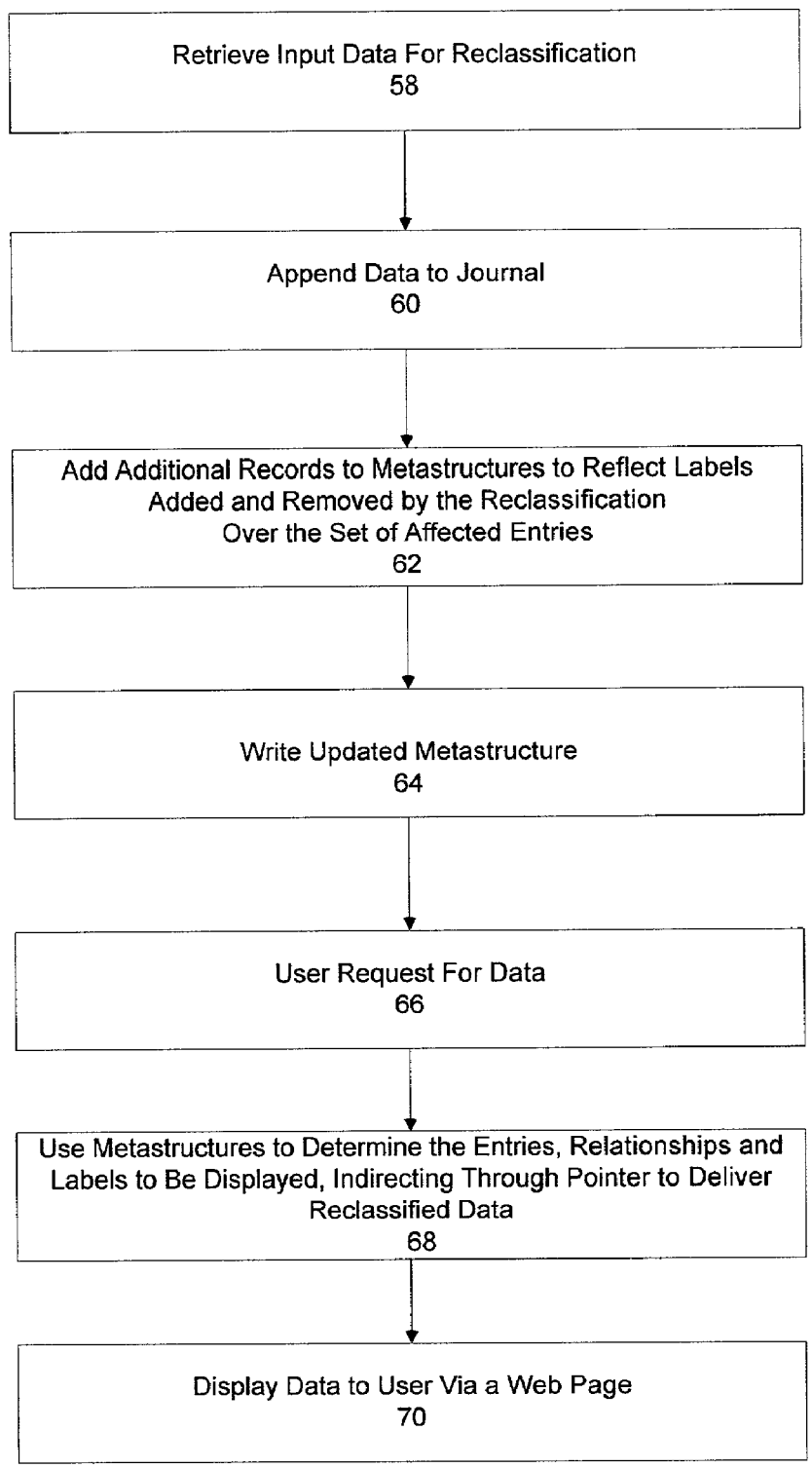
FIG. 2C is a flowchart of the sequence of steps followed by the illustrative embodiment in generating a web page for a reclassified entry.

FIG. 2C depicts the sequence of events occuring during generation of a web page for a reclassified entry. In the event of a reclassification, the input data containing the record of the reclassification is first retrieved (step 58) and then is appended to the journal (step 60). Additional records are then added to metastructures 9 to reflect labels added and removed by the reclassification over the set of affected entries or segments of entries (step 62). The updated metastructure 9 is then written (step 64). Upon receiving a user request (step 66), the metastructures 9 are consulted to determine the entries, relationships and reclassified labels to be displayed (step 68). The cumulative effect is presented to a user as a web page (step 70) with the actual content of the web page being retrieved from the journal. The pointers contained in the metastructures 9 are used to generate HTML links on the web page to other items or other entries.

Figure 3A:
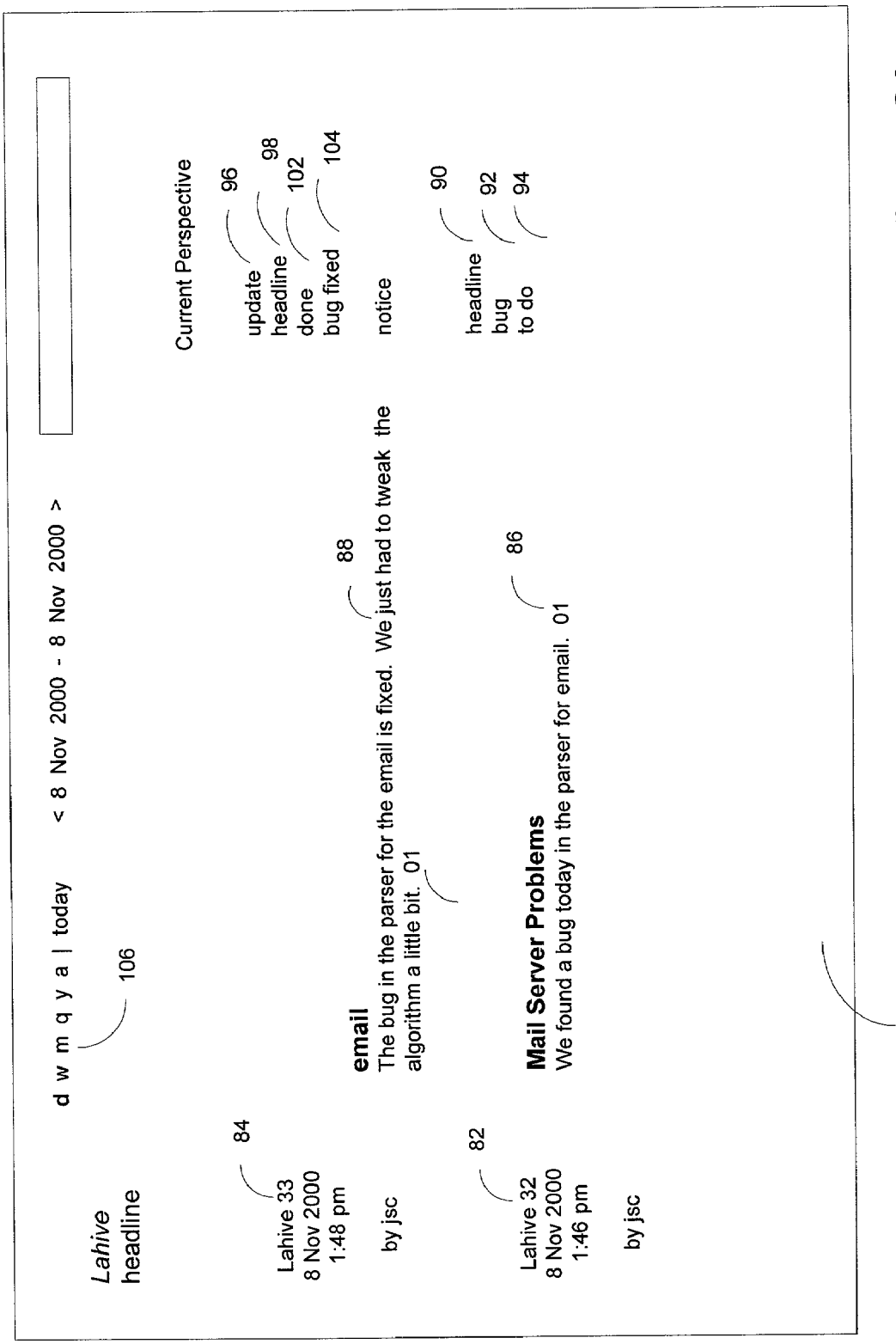
FIG. 3A depicts a web page generated by the illustrative embodiment of the present invention containing entry and item IDs.

FIG. 3A depicts a web page 80 generated by the illustrative embodiment from information contained within two emails sent to the server. The two emails, entitled "Mail Server Problems" and "email" are assigned the entry IDs Lahive32 (82) and Lahive33 (84) respectively. The content in both emails is text and contained within a single paragraph and is referenced as item Lahive32 item ID 01 (86) and Lahive33 item ID 01 (88) respectively. Lahive32 (82) has 3 separate labels "headline" 90, "bug" 92, and "to do" 94 indexed to the entry ID. Lahive33 (84) has 4 labels indexed to the entry ID, "update" 96, "headline" 98, "done" 100 and "bug fixed" 102. It also has a label "notice" 104 affixed to the content marked by the item ID 01 (88). The ability to affix labels to specific groups of content within an entry enables searching and displaying of selected information. Clicking on any of the labels with a mouse results in a new web page being generated by the illustrative embodiment which contains all the entries/items for which the specific labels apply (in the selected time slice and perspective). FIG. 3B depicts a web page 110 generated by clicking on the "notice" label 104 of FIG. 3A which shows all the entries in the selected time slice and perspective which contain the "notice" label.

The illustrative embodiment of the present invention allows a user to select a time slice to be displayed. The time slice governs which entries will be displayed to a user. In the embodiment depicted in FIG. 3A, the available time slices are daily, weekly, monthly, quarterly, yearly and all time which may be selected by a user by clicking on the time slice selector 106. FIG. 3A depicts a daily time slice.

Figure 4A:
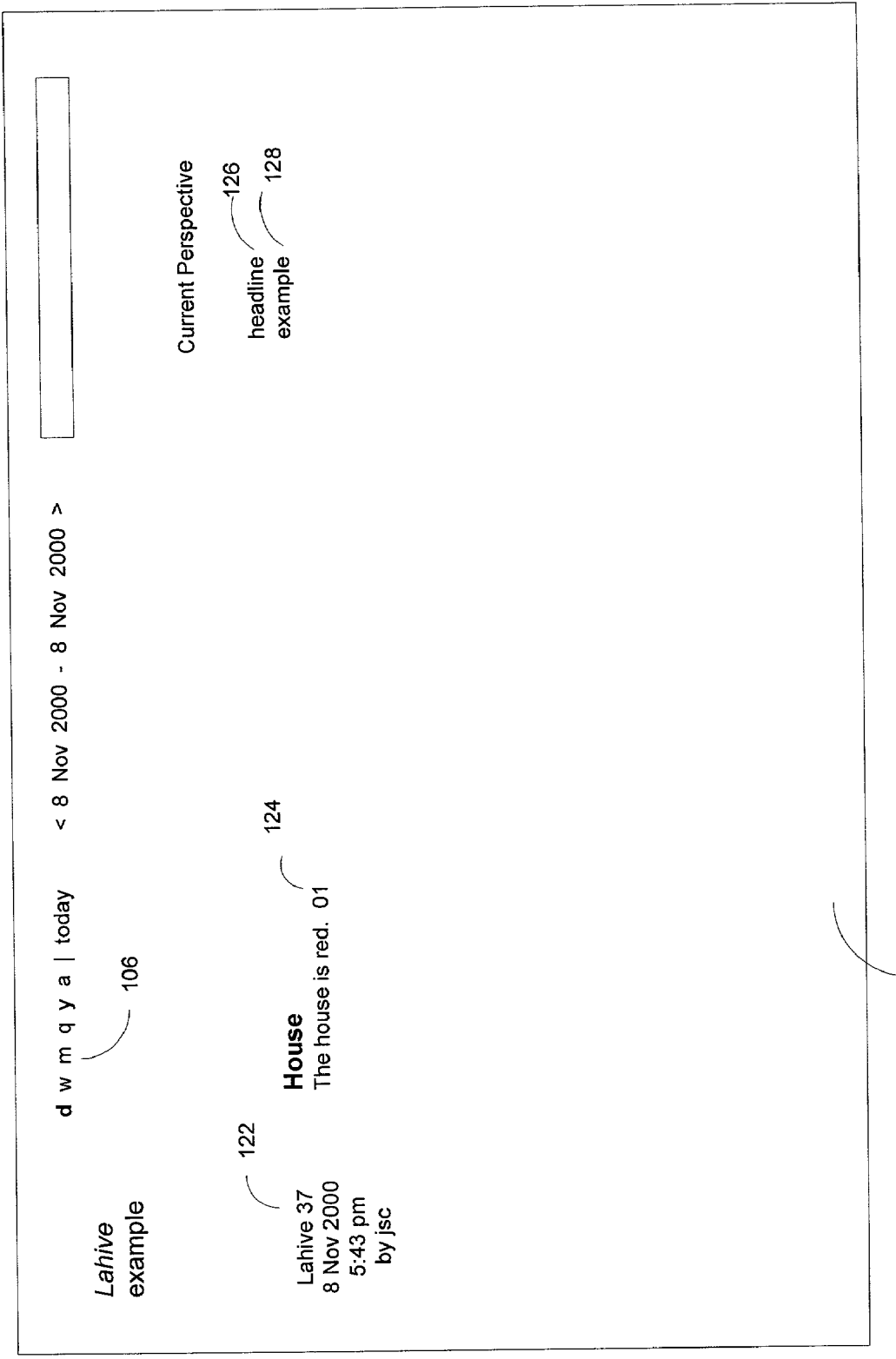
FIG. 4A depicts a web page generated by the illustrative embodiment of the present invention with the time slice set to "today"

The update process is depicted in the following series of illustrations. FIG. 4A depicts a web page 120 dynamically generated by the illustrative embodiment at user request with the time slice selector 106 set to "today". The "today" time slice lists all of the labels in this entry that exist in the most recent version of the entry. The web page 120 is generated as a result of an email to the server running the illustrative embodiment. The email, entitled "House", is assigned the entry ID Lahive37 (122) and contains the content "The house is red" which is given the item ID 01 (124). Labels "headline" 126 and "example" 128 are attached to the entry as a result of a designation contained in the email. In one aspect of the embodiment, an email subject line may contain an indicator, such as a punctuation mark (i.e.:colon), followed by a label. The label is then added to the metastructure 9 for the data.

Figure 4B:
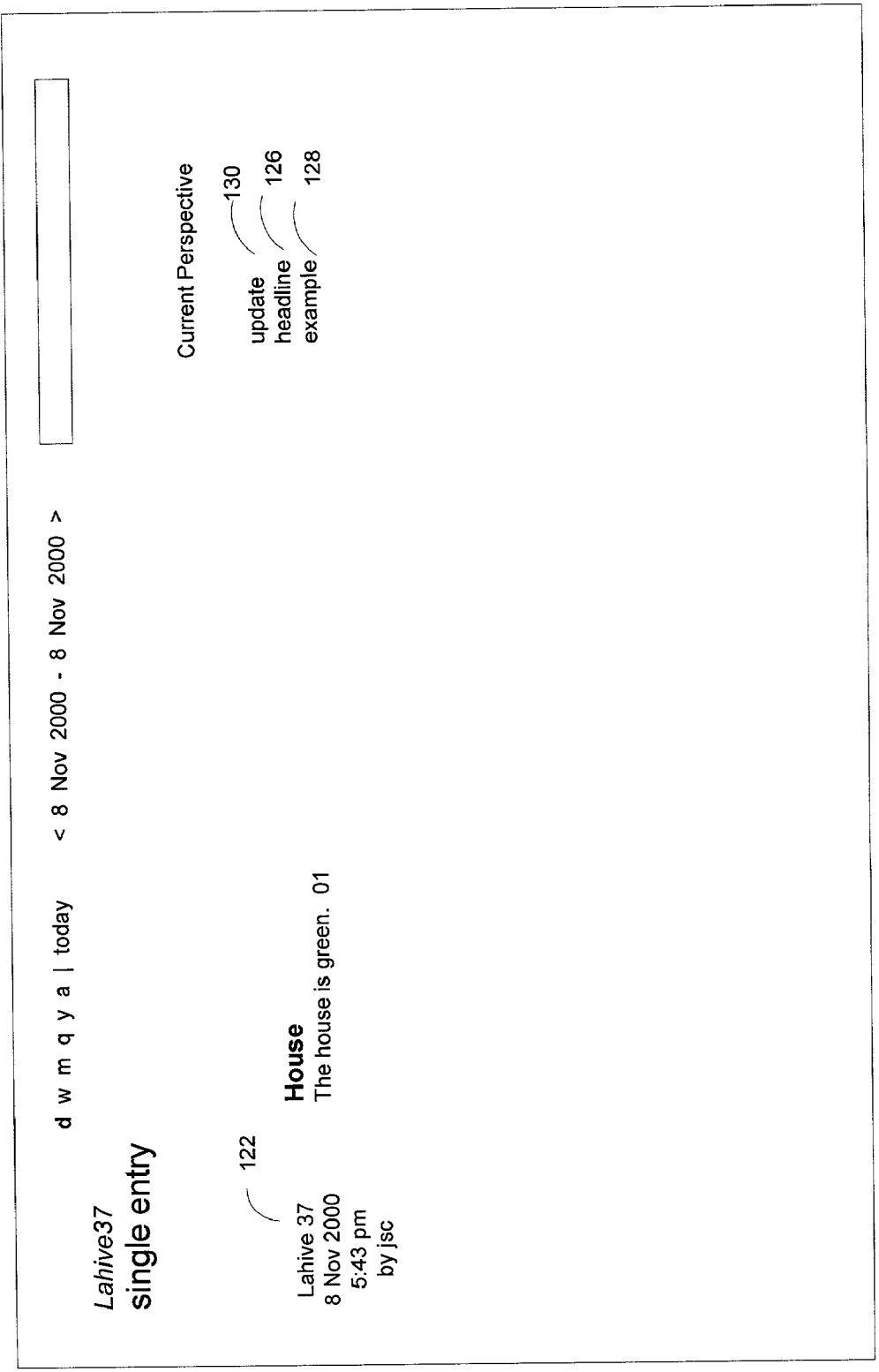
FIG. 4B depicts the web page of FIG. 4A with updated content.

FIG. 4B depicts the results of a user updating the content of Lahive37 (122) by changing the entry content to "The house is green". The illustrative embodiment automatically generates an "update" label 130 for Lahive37. A new entry Lahive38 is generated but is cross-linked to the original entry Lahive37. The "update" label 130 is inserted into Lahive37 as if it had been there from the beginning when viewing the Lahive37 entry in current perspective. The concept of "perspective" as used in the illustrative embodiment is addressed further below.

Figure 4C:
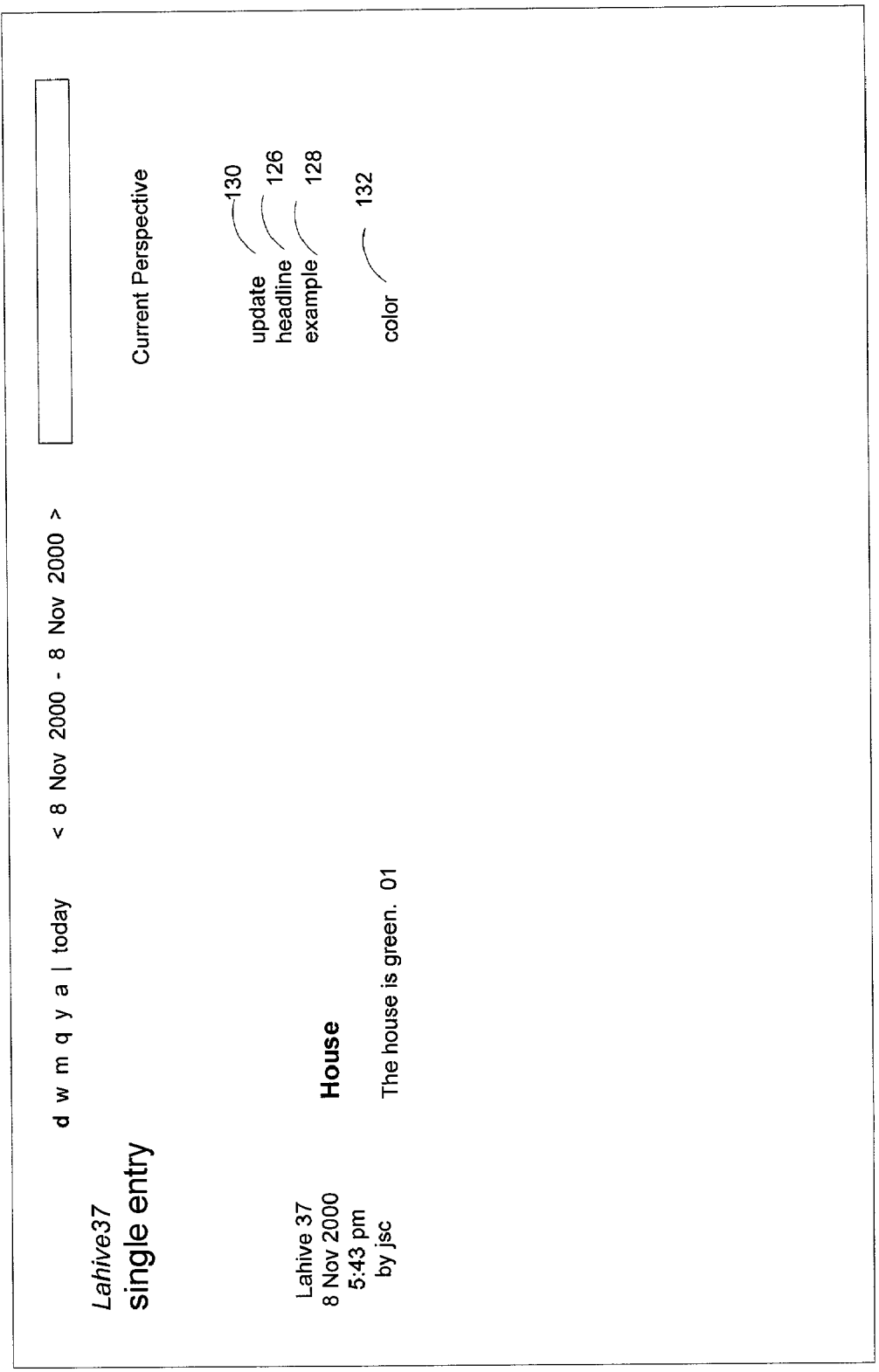
FIG. 4C depicts the web page of FIG. 4B with the content of item ID 01 reclassified.
Figure 4D:
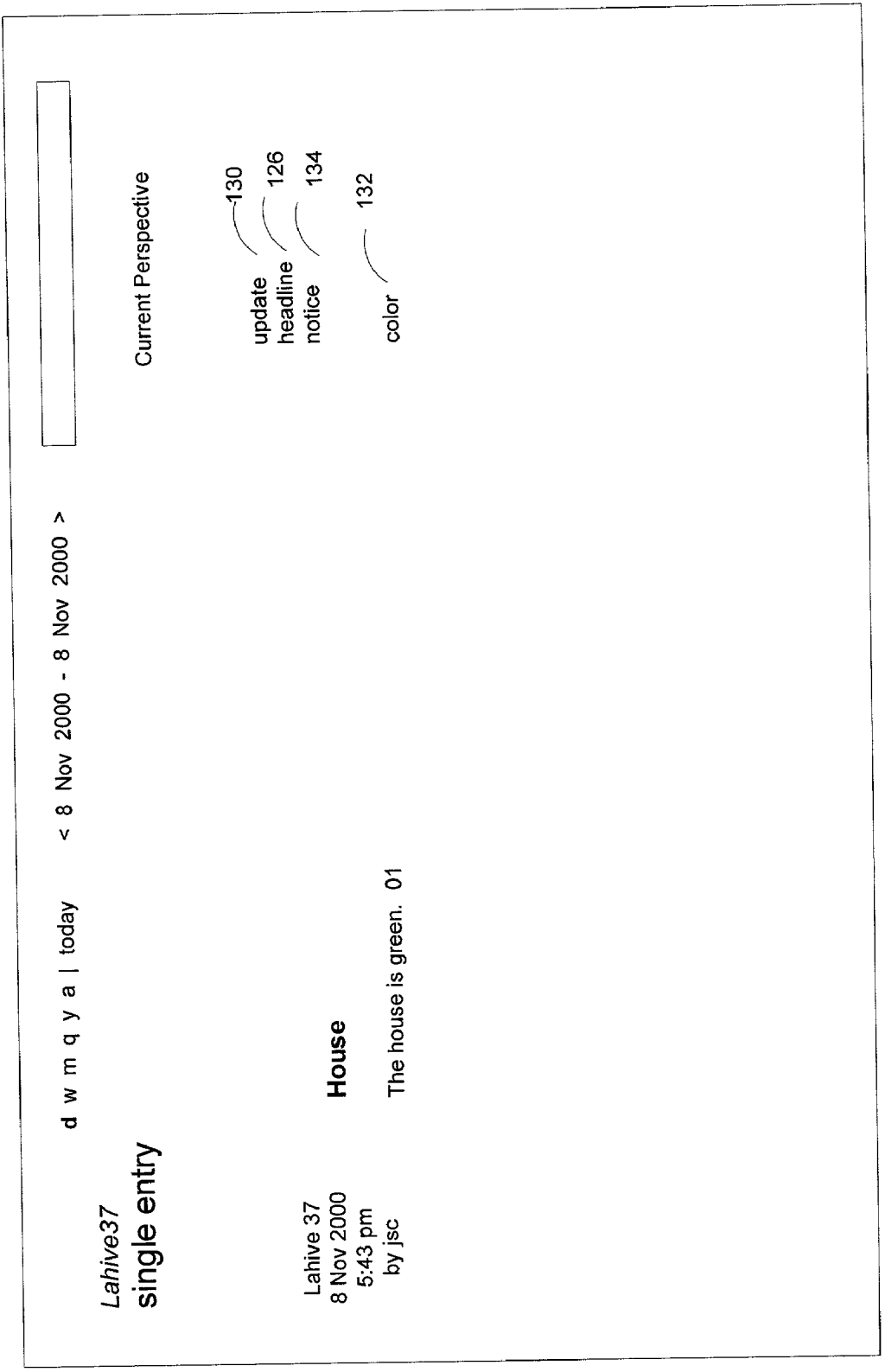
FIG. 4D depicts the web page of FIG. 4C with one of the labels attached to the entry ID reclassified.

The set of labels associated with any entry or item may be changed over time. This is called "reclassification". Reclassification changes only the labels; the content of the entry or item remains the same. FIG. 4C depicts the reclassification of item ID 01 in Lahive37 by attaching the label "color" 132. Similarly FIG. 4D depicts the replacement of the entry label "example" 128 with the label "notice" 134. A user may also reclassify multiple entries at the same time by exchanging one label for another. In one embodiment of the present invention, a user can add a new label, remove a label, or replace an existing label by clicking to the side of a current entry or item. In another embodiment, the time slice and perspective are retained when the user clicks on labels to generate new web pages.

Figure 4E:
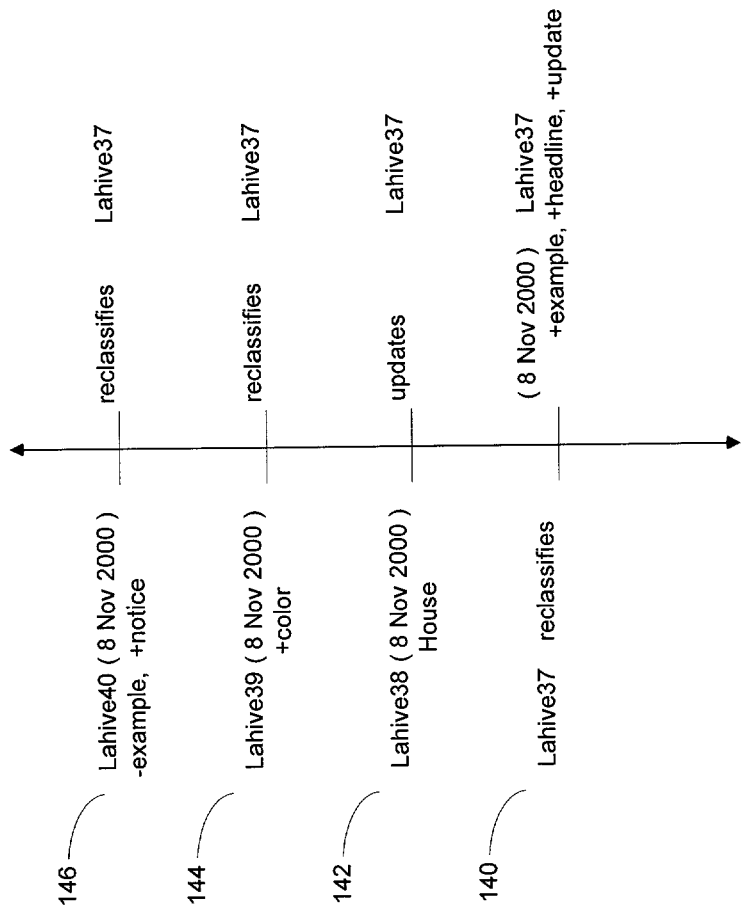
FIG. 4E depicts a timeline for the changes to the web page depicted in FIG. 4A.

The illustrative embodiment maps any changes to an original entry into a data structure which can be used to produce a timeline of the entry. FIG. 4E represents a timeline for the updates and reclassifications of Lahive37 depicted in FIGS. 4A through 4D. The original email message is assigned the entry ID Lahive37 and listed as reclassifying itself because it contains original labels, and adding labels is always treated as a reclassification 140. The update which changed the content from "The house is red" to "The house is green" creates a new entry Lahive38 which updates and cross-links to the original entry Lahive37 (142). The addition of the label color attached to the item 01 in Lahive37 causes the creation of a new entry Lahive39 which cross-links to the original entry Lahive37 (144). The subtraction of the label "example" and the addition of the label "notice" creates a new entry Lahive40 which cross-links to the original entry Lahive37 (146). By tracking the changes to the original entry and automatically cross-linking newly created entries to the original entry the illustrative embodiment is able to present the data contained in the entries to a user from a number of different time perspectives. The content can be tracked as it changes over time and the updated information presented from any of the cross-linked entries.

In one embodiment of the invention, metastructures 9 are used to access entries by entry ID, label, date, or relationship, and update the content or relationships among entries. The metastructures 9 include memory resident data structures (and corresponding disk resident representations) of a journal entry structure, a "project info" structure, and a global store structure. The journal entry structure includes a combination of a project index and an entry index which together uniquely locate a particular entry within a journal. The project index locates that entry in a vector of "project info" structures, while the entry index selects a single "journal entry" structure within the given project. The journal entry structure also includes an entry index which selects the original entry of a chain of updates within that project, and an entry index which selects the last entry of a chain of updates within that project. A field specifies where the parsed content of the entry is stored, and is represented as a locator ID within a file containing the parsed content of all of the journal entries. For the original entry of a chain of updates, the journal structure includes a pointer to an array of vectors of ternary relationships of the form subject—verb—direct object, where the subject and direct object are unique entry identifiers, and the subject specifies the unique identifier of the current entry ("Outgoing references"). Also included for an original entry in the journal structure is a pointer to an array of vectors of ternary relationships of the form subject—verb—direct object, where the subject and direct object are unique entry identifiers, and the direct object specifies the unique identifier of the current entry ("Incoming references"). Fields which record the date and time that the entry was posted, and by whom the entry was posted, are also included in the journal structure. Additional fields which record the type of entry, including the types of: new entry, update entry, and label re-classification entry are also included in the journal entry structure.

The metastructures also includes a vector of "project info" structures. The project info structures are referenced by a project index value and include a reference to a vector of "journal entry" structures which record metadata associated with each entry created within that project. Also included in each project info structure is a reference to a hash table of references to "label definition" structures created within that project, indexed by label name. The label definition structures contain fields recording when the label was created, by whom it was created, and the spelling of the label name. The label definition structure also contains a reference to a vector of "label instance" structures. The label instance structures include the unique identifier of the journal entry and the item number to which the label was added or removed (the "Subject" entry) and the unique identifier of the journal entry which performed the action of adding or removing the label (the "Direct Object" entry). The project info structure also includes a vector which records the spelling of the project's name, a vector which records the spelling of each label name created within the project, and a hash table of references to "label definitions" created within that project, indexed by name.

A global data structure stores data for non-project scoped search requests, and includes separate data structures for a vector of references to each "label instance" which adds a label, a vector of references to each "label instance" which removes a label, and a vector of references to each "journal entry" within the journal. Those skilled in the art will recognize that different data structures allowing similar functionality may be substituted for the described metastructures 9 without departing from the scope of the present invention.

Entry ID cross-references appearing in entries are tracked and stored in metastructures. An Entry ID cross-reference may be represented as an explict part of an entry, or may be recognized while parsing the content of the entry. One embodiment of the present invention recognizes the occurrence of a project name followed by a number as a cross-reference to a designated entry, (for example "Lahive36") or a specific item within that entry ("Lahive36.02"). Whenever an entry "I" references another entry/item "J", a grammar object representing the relationship "I references J" is stored in the metastructure 9 associated with the entry ID. This relationship can be made visible in both the referencing and referenced entry. One embodiment of the present invention renders a textual reference to a project name and entry number ("Lahive36") as an HTML link to the current version of the content of the referenced entity. Updates to the referencing entry which add or remove Entry ID cross-references result in creation or deletion of active cross-references. Updates applied to the referenced entity allow the most current updated content to be displayed when an Entry ID reference to that entry is followed. These cross-references are available for a user to inspect by clicking the appropriate button on a displayed web page.

The illustrative embodiment of the present invention also allows a user to select the perspective to be depicted on the displayed web page. Whereas the time slice governs which entries to include in the documents published for a users viewing, the perspective governs which reclassifications to apply to the view. The "current perspective" shows the net effect of all of the label additions and removals. By setting the perspective to a certain date, the view shows the net effect of all of the label additions and removals that took place by a given date. By setting a range of dates for the perspective, the user's view will include the net effect of all label additions and removals up until the beginning of the range and all of the additions taking place during the range. By setting the perspective to "all time", the view will include all of the labels added without showing the net effect of label removals. By combining the time slice selector setting 52 with the perspective setting, the illustrative embodiment enables the rapid and flexible presentation of information to a user.

Three types of topic view are supported. In the "normal" topic view the entries displayed are those entries which were posted during the selected time slice, and which, for the specified perspective, had the specified label or labels associated with one or more items. For example, entries posted last week which would have been displayed with the "to do" label during the weekend. The "added" topic view displays those entries to which a specified label was added during a particular time slice, regardless of when the entry itself was posted. For example, all of the entries to which the label "done" was added today. The "removed" topic view. displays those entries from which a specified label was removed during a particular time slice, regardless of when the entry itself was posted. For example, all of the entries from which the label "to do" was removed last Thursday.

The illustrated embodiment of the present invention enables the presentation of data to a user from a number of different viewpoints. The presentation of data to the user is accomplished through the use of a user selected "time slice" and a user selected "perspective". The time slice represents a selected period of time. The web page 150 depicted in FIG. 5, has available time slice sizes on a time slice size selector 106 representing the selected day, the selected week, the selected month, the selected quarter and the selected year. A user can select the time slice by clicking on one of the choices. The user may also enter a time slice range into the rapid selector 152. The selected time slice is displayed in a time slice display area 154 located between the rapid selector 152 and the time slice selector 106. The selected time slice is a user selected range Nov. 8, 2000-Nov. 13, 2000. Clicking the left arrow shifts the time slice backward in time by the selected time slice size; the right arrow shifts the time slice forward in time by the selected time slice size. The perspective governs which reclassifications to apply to the view. Like the time slice, the perspective is also changed by a user entering codes into the rapid selector 152. The perspective is displayed in the perspective display area 156. In FIG. 5, the "current perspective" is displayed. The "current perspective" shows the net effect of all of the label additions and removals. By setting the perspective to a certain date, the view shows the net effect of all of the label additions and removals for an entry/item that took place by a given date. By setting a range of dates for the perspective, the user's view will include the net effect of all label additions and removals up until the beginning of the range and all of the additions taking place during the range. By setting the perspective to "all time", the view will include all of the labels added without showing the net effect of label removals. By combining the time slice setting with the perspective setting, the illustrated embodiment enables the rapid and flexible presentation of information to a user.

Clicking on any of the labels 158, 160, 162 and 164 with a mouse results in a new web page being generated by the illustrated embodiment which contains all the links referenced by the specific labels. For example, clicking on the notice label 162 will generate a web page entitled "notice" which shows all the entries in the time slice containing the notice label. An HTML link under the "notice" label 162 references a table which contains pointers to all of entries containing the label "notice". The data from the entries containing the label "notice 162 is used to generate a new web page for display to the user. The "Related Entries" section 166 indicates that this entry has previously undergone 3 reclassifications 168, the addition/removal of labels, and 1 update 170, the changing of content. The labels which are presented depend upon the selected perspective.

In addition to the ability to conduct searches by time and topic, the illustrated embodiment of the present invention also provides a user with the capability to conduct full text content searches which are confined to a particular time slice. In the event a user enters a text based search into the rapid selector 152, the web publishing system consults the metatstructure indices to determine which entries fall within the selected time slice. Once those entries are identified, the content of the entries is pulled from the journal and searched for matches with the user-entered search terms. In addition to content matches within the time slice, the user may further qualify the search request to return content matches only for entries or items to which specified labels have been applied in a selected perspective. The search results are then further refined so that only the latest version of an entry (as indicated by "forwarding pointers" contained in the metastructure 9 indices) is returned for the user. This refinement of search results prevents a user from being overwhelmed with duplicative and out-of-date data. Alternatively, the user may specifically request the search return the different versions of the same entry.

In a workgroup setting, the addition of a label to an entry can be used to control workflow. In one embodiment, restrictions are placed on users viewing entries created by others. In such an embodiment, the placing of a label exposes the entry to others otherwise not privileged to see the entry, by allowing them to see the entry in response to a search keyed to the placed label. In an alternative embodiment, the placing of a label will not expose the entry to those who were not otherwised cleared to see the entry. In some embodiments, the ability to add labels to entries in a project is restricted to certain individuals.

Figure 6C:
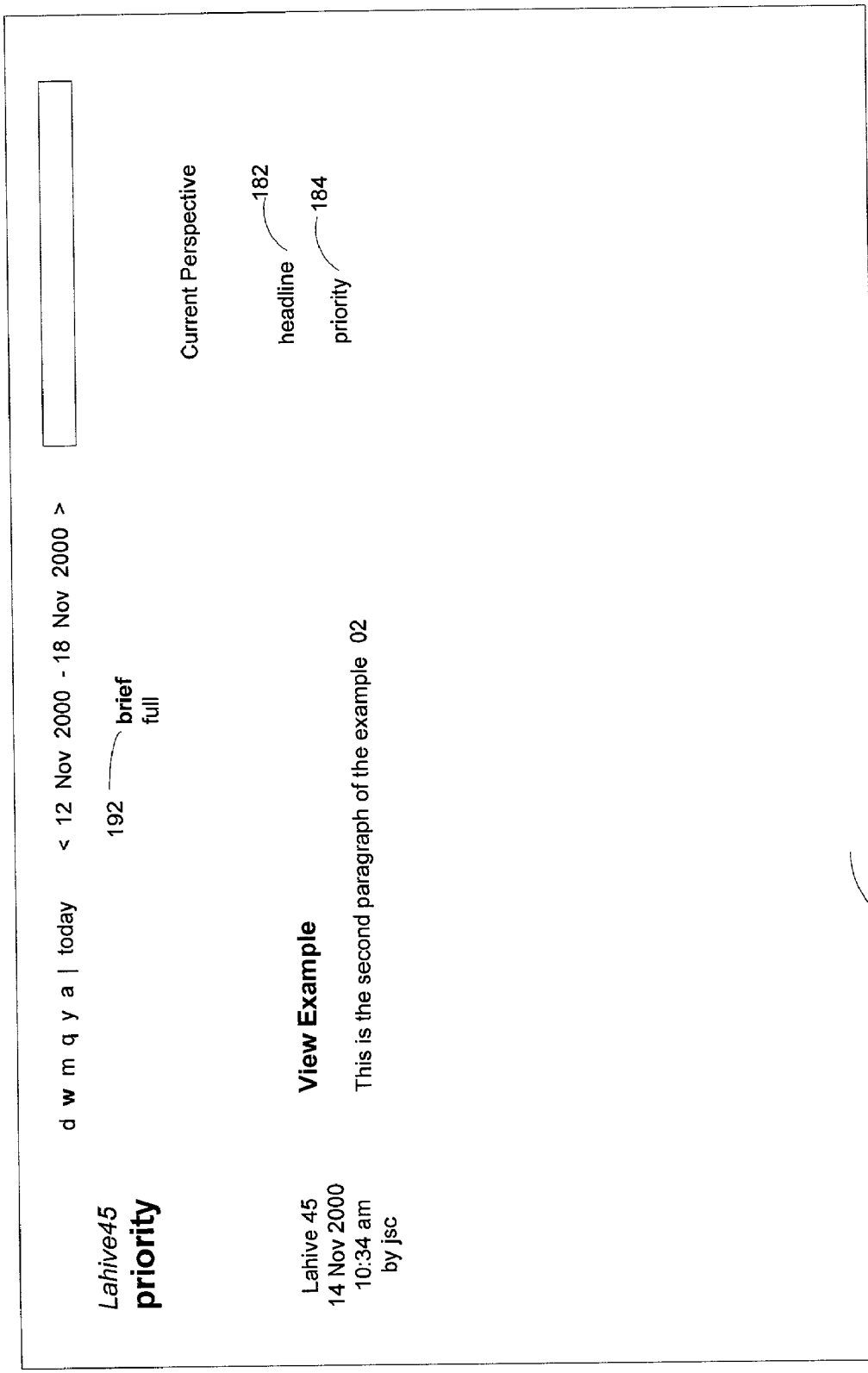
FIG. 6C depicts a web page generated from the web page of FIG. 6B by clicking on the topic priority which is displayed in "brief" mode.
Figure 6D:
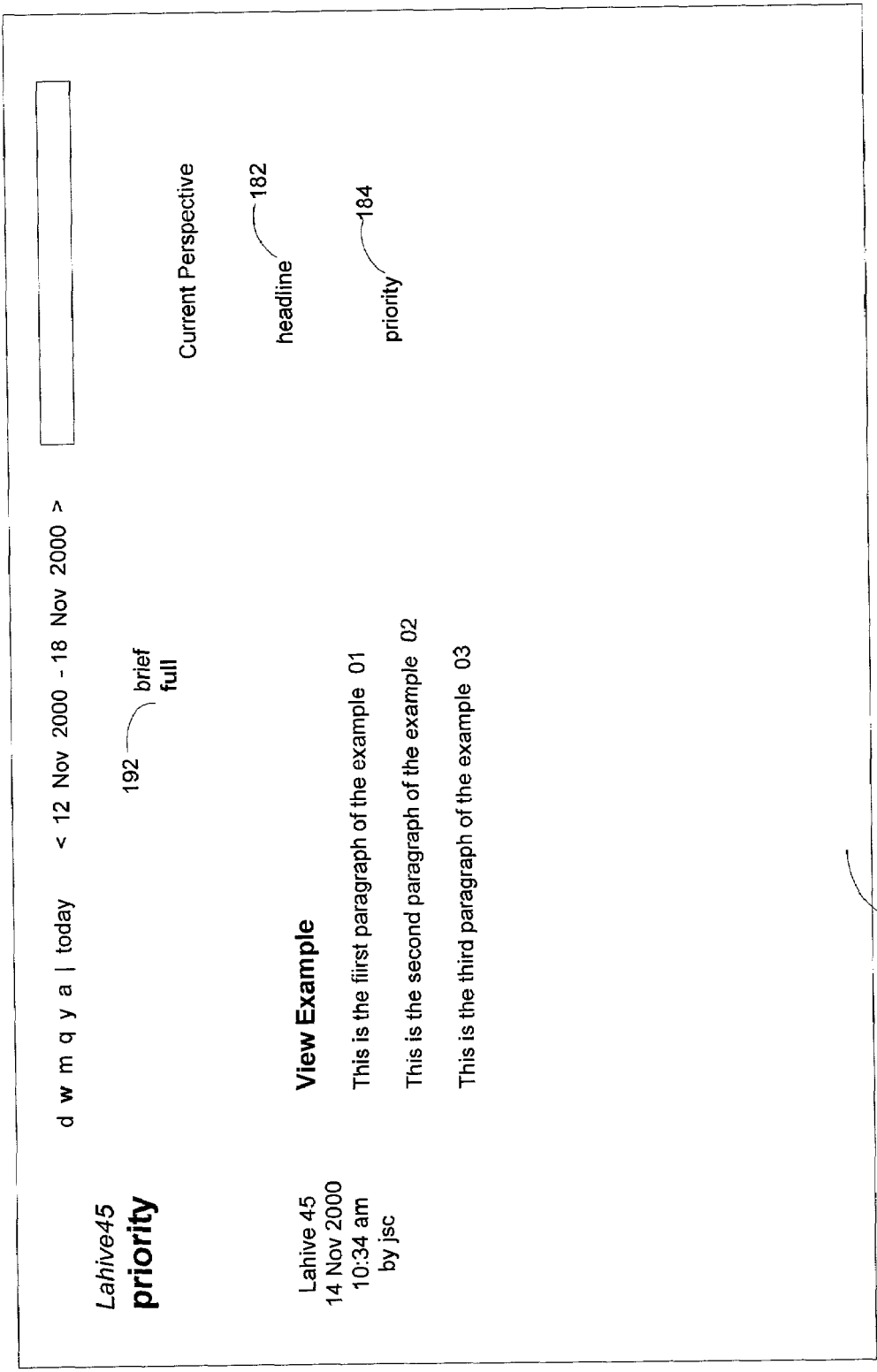
FIG. 6D depicts a web page generated from the web page of FIG. 6B by clicking on the topic priority which is displayed in "full" mode.

In another embodiment, a user has the capability to email a server running the illustrated embodiment and have the email stored as an entry by the web publishing system. The user may specify labels for the entry by using specific notation in the email. The server reads a mailbox which receives emails sent to a specified email address. FIG. 6A depicts an email 174 sent to a server running the illustrated embodiment. In one embodiment, the notation ":headline" 176 causes a headline label to attach to the entry. Entries/items labeled "headline" are displayed on the newspage. The notation "+:priority" 178 causes a new label "priority" to be created and assigns the "priority" label to the second paragraph of the entry. FIG. 6B depicts the message of FIG. 4A displayed as a web page 180. The "headline" label 182 is affixed to the entry ID Lahive45 (186) and the "priority" label 184 is affixed to the Lahive45 item ID 02 (188). Clicking on the "priority" label 184 generates a new web page containing all of the entries and items in the time slice and perspective which are labeled with "priority" labels. FIG. 6C depicts a web page 190 generated by clicking the "priority" label 184 of the web page 180 depicted in FIG. 6B. The web page 190 listing the references to the "priority" label may be displayed in "brief" mode as indicated in FIG. 6C by clicking on a mode button 192. In brief mode, only the item/entry labeled is displayed. Alternatively, the web page may be displayed in "full" mode. A user may switch between views by clicking on the mode button 192 on the toolbar. FIG. 6D depicts the web page of FIG. 6C in full mode. The entry content is completely listed, not just the labeled paragraph 184.

Figure 7:
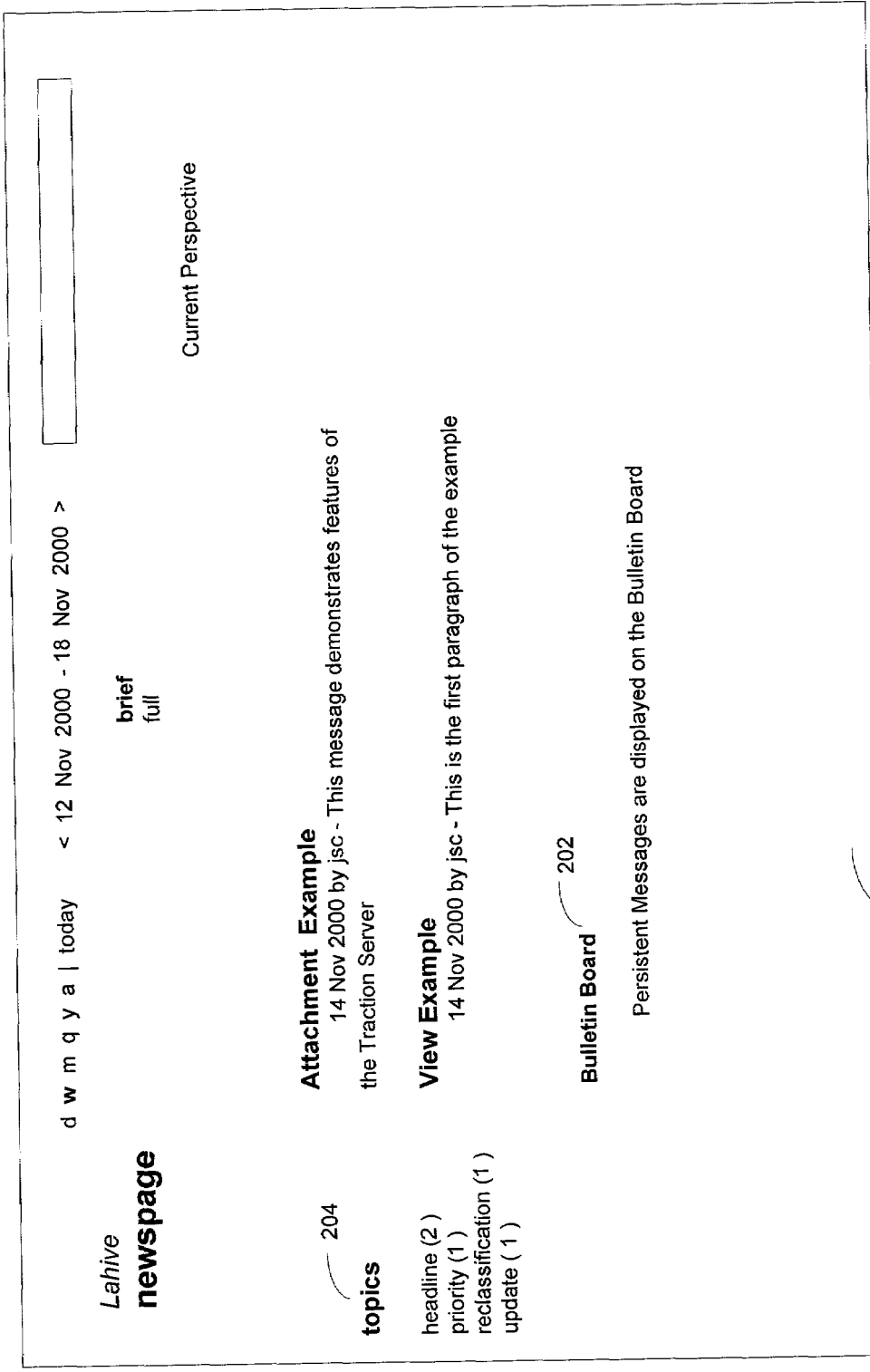
FIG. 7 depicts a web page generated by the illustrative embodiment of the present invention containing a topic summary for the current time slice.

The illustrated embodiment of the present invention includes the capability of displaying all of the labels/topics which are active during the applicable time slice given the specified perspective. FIG. 7 depicts a web page 200 laid out in a newspage format. The web page 200 includes a "bulletin board" area 202. The web page 200 lists all of the active topics in a column 204. The topics represent links and clicking on any of them will generate a new web page summarizing all the entries/items labeled with the particular topic. The bulletin board 202 allows a user to post a message that will always be seen in the newspage regardless of the user selected time slice. In order to add an entry to the bulletin board section 202 of every Newspage generated, the user applies the label ":bulletin" to the entry. In order to remove an entry from the bulletin board 202, the user removes the ":bulletin" label from the entry.

Figure 8A:
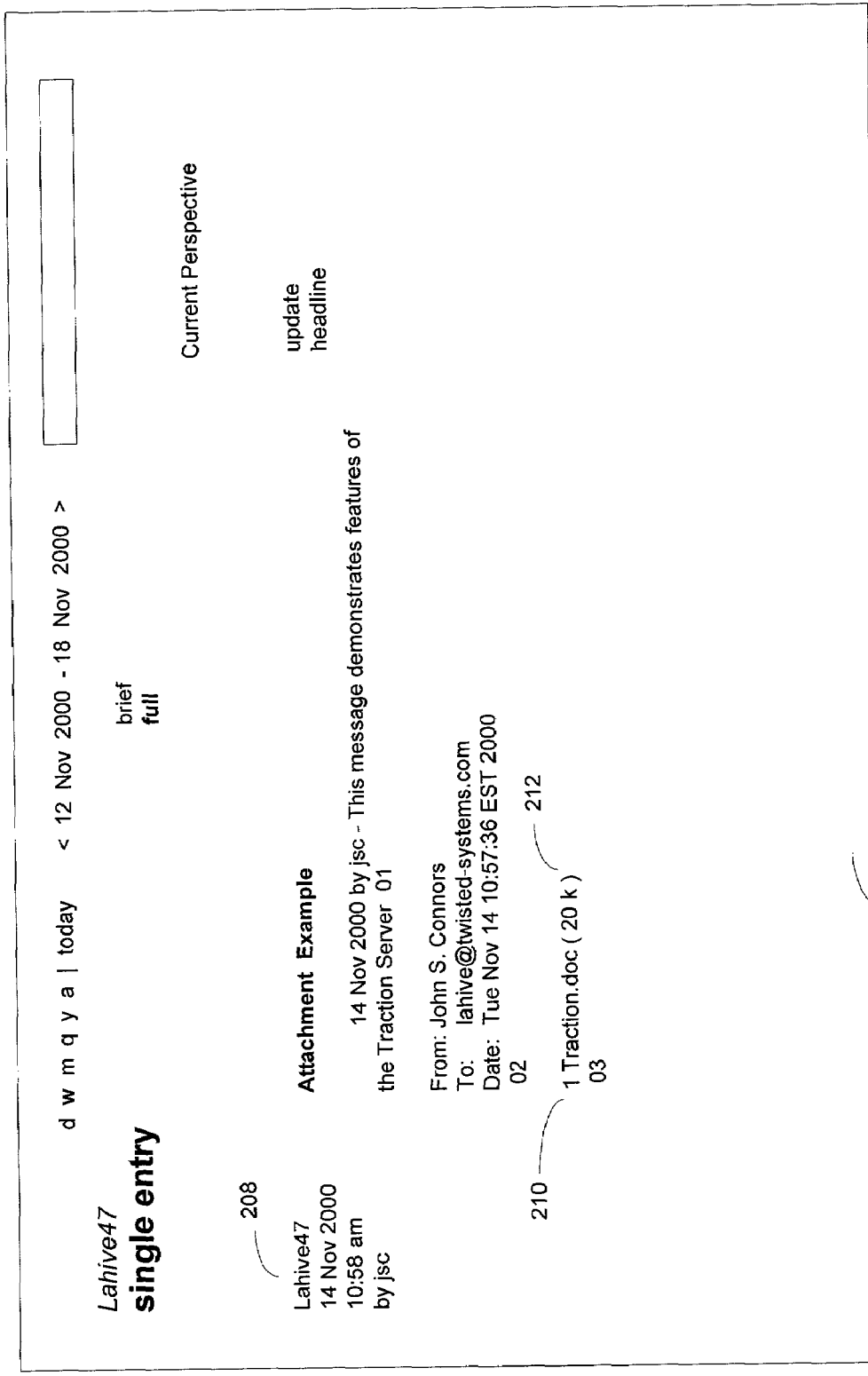
FIG. 8A depicts an entry on a web page with an attachment.
Figure 8B:
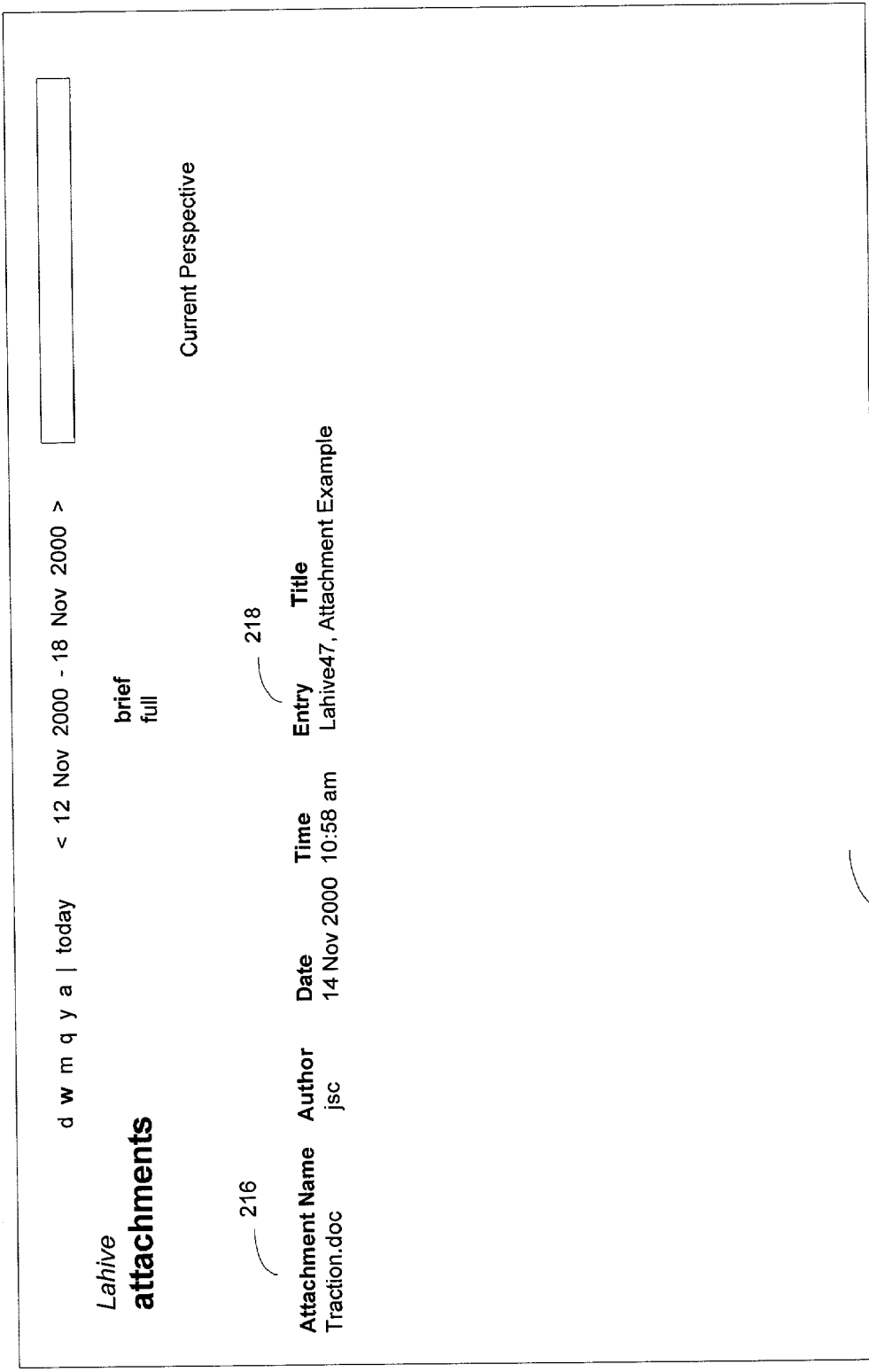
FIG. 8B depicts a web page summarizing the attachment of FIG. 8A.

In another embodiment of the illustrated invention, a user may display information about documents attached to entries. FIG. 8A depicts a web page 206 generated by clicking on the message title "Attachment Example" or the entry ID Lahive47 (208). The original email contains an attachment Traction.doc 210 which appears as a separate item (03) on the web page 206. A user may click on the attachment link 212 to receive details about all of the attachments attached to the entry displayed, Lahive47 (208). FIG. 8B depicts an attachments web page 214 generated by the illustrated embodiment which includes an Attachment column 216 listing the attachment Traction.doc 98 and an entry column 218 with the entry Lahive47.

In one embodiment, in an electronic device, a medium holds computer-executable instructions for providing a plurality of entries containing data. The instructions also assign an entry identification number ("entry ID") which is a unique value to each of the entries. The instructions also store each entry indexed by its entry ID and alter a selected one of the entries to create a new entry. The new entry has an entry ID assigned that is cross-indexed with the selected entry. The instructions further update a metastructure associated with the selected entry to indicate the time the selected entry was altered and display the new entry in response to requests for the selected entry. In one aspect, the instructions parse the selected entry into segments and assign an item ID having a unique value to each of the segments. The instructions also update the metastructure of the selected entry to include a reference to the item ID. In another aspect, the instructions attach a label to at least one of the segments and cross-index the label with the segment, the selected entry and with a table of other entries containing segments with the label.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps depicted in the

We claim:

1. A computer-implemented method, comprising:
    parsing a plurality of entries containing data into one or more parts, each entry associated with a metastructure containing metadata;
    attaching a user-provided label to a user-selected part of a selected entry selected from the plurality of entries, the label being added to the metadata for the selected entry so that the label is cross-indexed with the selected entry, cross-indexed with the user-selected part and cross-indexed with other entries containing the label;
    altering the data contained in the selected entry to create an updated entry;
    cross-indexing the updated entry with the selected entry;
    updating the metastructure associated with the selected entry to reflect relationship changes caused by updated entry, the updating including a time the selected entry was altered, the metastructure associated with the selected entry maintaining a list of at least one relationship change between the selected entry and at least one other entry that shows an evolution of the selected entry over a time period that includes a time period before the updating;
    displaying the updated entry in response to a request for the selected entry;
    receiving selections, via at least one displayed selector, of a time slice and a perspective to apply to the selected entry, the time slice corresponding to a period of time, the perspective being a date reference that controls a selection of labels displayed with the selected entry;
    consulting the metastructure associated with the selected entry to retrieve relationship changes for the selected entry during the selected time slice and perspective; and
    displaying a view of the selected entry governed by the time slice and perspective, the view displaying the data for the selected entry as it existed during the selected time slice and displaying labels for the selected entry based on the selected perspective.

2. The method of claim 1, further comprising:
    assigning an item ID having a unique value to each of the parts; and
    updating the metastructure of the selected entry to include a reference to the item IDs assigned to each of the parts.

3. The method of claim 2, further comprising:
    appending the parsed data from the selected entry to a journal, the journal being a data structure located in permanent memory.

4. The method of claim 1 further comprising:
    searching the plurality of entries based on a label attached to at least one of the plurality of entries; and
    displaying a result of the search on a web page, the result indicating entries from the plurality of entries that contain the label.

5. The method of claim 4, further comprising:
    displaying a result of the search on a web page, wherein the web page indicates only the parts of the entries from the plurality of entries that contain the label.

6. The method of claim 1, further comprising:
    setting the perspective to a specified date;
    displaying a net effect of all label additions and removals for the selected entry which took place by the specified date.

7. The method of claim 1, further comprising:
    setting the perspective to a specified range of dates;
    displaying a result of at least one label addition and at least one label removal for the selected entry which took place by the beginning of the specified range of dates; and
    displaying at least one label addition that occurred during the specified range of dates.

8. The method of claim 1, further comprising:
    setting the perspective to include all dates;
    displaying the result of all label additions for the selected entry without displaying the effect of any label removals for the selected entry.

9. The method of claim 1, further comprising:
    providing a permanent memory location
    parsing the data contained within the selected entry; and
    storing the parsed data in a permanent memory location.

10. The method of claim 9, further comprising:
    storing a reference to at least one of, another entry, an update to the selected entry, and a labeling of the selected entry, in a metastructure stored in a data structure in the permanent memory location.

11. The method of claim 10 wherein the metastructure includes a grammar object, the grammar object expressing a ternary relationship among the data.

12. The method of claim 1 wherein the selected entry is an email message.

13. The method of claim 1 wherein the selected entry is an attachment to an email message.

14. The method of claim 1 wherein the selected entry is a web page.

15. The method of claim 1 wherein the selected entry is user-input text.

16. The method of claim 1 wherein the electronic device is interfaced with a network.

17. The method of claim 1 wherein the selected entry is audio data.

18. The method of claim 1 wherein the selected entry is video data.

19. The method of claim 1 wherein the selected entry is a complete document that is parsed as one part prior to the assignment of the entry ID.

20. A computer-readable storage medium holding computer-executable instructions that upon executing cause a computing device to:
    provide a plurality of entries containing data that are parsed into one or more parts, each entry associated with a metastructure containing metadata;
    attach a user-provided label to a user-selected part of a selected entry selected from the plurality of entries, the label being added to the metadata for the selected entry so that the label is cross-indexed with the selected entry, cross-indexed with the user-selected part and cross-indexed with other entries containing the label;
    alter the data contained in the selected entry to create an updated entry;
    cross-index the updated entry with the selected entry;
    update the metastructure associated with the selected entry to reflect relationship changes caused by the updated entry, the updating including a time the selected entry was altered, the metastructure maintaining a list of at least one relationship change between the selected entry and at least one other entry that shows an evolution of the selected entry over a time period that includes a time period before the updating;

display the updated entry in response to a request for the selected entry;

receive selections, via at least one displayed selector, of a time slice and a perspective to apply to the selected entry, the time slice corresponding to a period of time, the perspective being a date reference that controls a selection of labels displayed with the selected entry based on when the labels were associated with the selected entry;

consult the metastructure associated with the selected entry to retrieve relationship changes for the selected entry during the selected time slice and perspective; and display a view of the selected entry governed by the time slice and perspective, the view displaying the data for the selected entry as it existed during the selected time slice and displaying labels for the selected entry based on the selected perspective.

21. The medium of claim 20 wherein the medium further comprises instructions causing the computing device to:
 assign an item ID having a unique value to each of the parts; and
 update the metastructure of the selected entry to include a reference to the item ID.

22. The medium of claim 20 wherein the medium further comprises instructions causing the computing device to:
 search the plurality of entries based on a label; and
 display the results of the search in a document referencing entries from the plurality of entries that contain the label.

23. The medium of claim 20 wherein the selected entry is video data.

24. The medium of claim 20 wherein the selected entry is audio data.

* * * * *